United States Patent
Gupta et al.

(10) Patent No.: US 10,742,770 B2
(45) Date of Patent: *Aug. 11, 2020

(54) MONITORING SERVICES KEY PERFORMANCE INDICATORS USING TWAMP FOR SDN AND NFV ARCHITECTURES

(71) Applicant: Juniper Networks, Inc., Sunnyvale, CA (US)

(72) Inventors: Peyush Gupta, Bangalore (IN); Amit Kumar Agarwal, Bangalore (IN); Srivathsa Sarangapani, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,226

(22) Filed: Jul. 9, 2018

(65) Prior Publication Data
US 2018/0324281 A1 Nov. 8, 2018

Related U.S. Application Data

(63) Continuation of application No. 14/755,961, filed on Jun. 30, 2015, now Pat. No. 10,021,216.

(30) Foreign Application Priority Data

May 25, 2015 (IN) .......................... 2616/CHE/2015

(51) Int. Cl.
*H04L 12/26* (2006.01)
*H04L 29/06* (2006.01)
*H04L 29/08* (2006.01)

(52) U.S. Cl.
CPC .............. *H04L 67/42* (2013.01); *H04L 43/08* (2013.01); *H04L 43/0805* (2013.01);
(Continued)

(58) Field of Classification Search
CPC . H04L 43/08; H04L 43/0805; H04L 43/0864; H04L 43/087; H04L 43/0876;
(Continued)

(56) References Cited

U.S. PATENT DOCUMENTS 6,363,478 B1 3/2002 Lambert et al.
8,842,578 B1 * 9/2014 Zisapel ................. H04L 43/045
370/255

(Continued)

FOREIGN PATENT DOCUMENTS

EP 2629477 A1 8/2013
EP 2690824 A1 1/2014
(Continued)

OTHER PUBLICATIONS

Examination Report from counterpart European Application No. 16170977.9, dated Dec. 6, 2017, 4 pp.
(Continued)

*Primary Examiner* — Sargon N Nano
(74) *Attorney, Agent, or Firm* — Shumaker & Sieffert, P.A.

(57) ABSTRACT

Techniques are described for extending a two-way active measurement protocol (TWAMP) to enable measurement of service key performance indicators (KPIs) in a software defined network (SDN) and network function virtualization (NFV) architecture. The TWAMP extensions enable control messaging to be handled by a TWAMP control client executed on a centralized controller, and data messaging to be handled by a TWAMP session initiator executed on a separate network device. Techniques are also described for extending TWAMP to enable measurement of any of a plurality of service KPIs for a given service supported at a TWAMP server. The service KPIs may include one or more of keepalive measurements, round trip time measurements, (Continued)

path delay measurements, service latency measurements, or service load measurements. The TWAMP extensions for the service KPIs may be used in both conventional network architectures and in SDN and NFV architectures.

20 Claims, 19 Drawing Sheets

(52) U.S. Cl.
CPC ........ *H04L 43/087* (2013.01); *H04L 43/0864* (2013.01); *H04L 43/0876* (2013.01); *H04L 67/14* (2013.01); *H04L 43/10* (2013.01); *H04L 43/50* (2013.01)

(58) Field of Classification Search
CPC ......... H04L 43/10; H04L 43/50; H04L 67/14; H04L 67/42; H04L 41/5038; H04L 45/70; H04L 67/142; H04L 29/08; H04L 12/16; H04L 43/106; H04L 43/0858; H04L 29/06; H04L 69/24; H04L 4/56; H04L 12/26; H04W 24/08; H04W 29/09; H04W 24/00; H04W 24/10; H04W 72/085; G06F 2201/815; G06F 9/45558
See application file for complete search history.

(56) References Cited

U.S. PATENT DOCUMENTS

| | | | |
|---|---|---|---|
| 8,843,738 | B2 | 9/2014 | Vos |
| 9,131,026 | B2 | 9/2015 | Hu et al. |
| 9,154,532 | B2 | 10/2015 | Gutierrez |
| 9,306,830 | B2 | 4/2016 | Robitaille |
| 9,419,883 | B2 | 8/2016 | Wallman et al. |
| 9,426,042 | B2 | 8/2016 | Park et al. |
| 9,531,621 | B2 | 12/2016 | Kölhi et al. |
| 9,563,900 | B1 | 2/2017 | Guo et al. |
| 9,705,769 | B1 | 7/2017 | Sarangapani et al. |
| 9,923,796 | B2 | 3/2018 | Mirsky |
| 9,960,982 | B2 | 5/2018 | Nydell |
| 9,998,565 | B2 | 6/2018 | Gupta et al. |
| 10,021,216 | B2 | 7/2018 | Gupta et al. |
| 10,063,449 | B2 | 8/2018 | Mirsky et al. |
| 10,110,455 | B2 | 10/2018 | Sarangapani et al. |
| 10,218,590 | B2 | 2/2019 | Gupta et al. |
| 2012/0128000 | A1* | 5/2012 | Baillargeon ............ H04L 43/10 370/392 |
| 2013/0138822 | A1 | 5/2013 | Hu et al. |
| 2013/0305036 | A1 | 11/2013 | Vos |
| 2014/0029441 | A1* | 1/2014 | Nydell ................ H04L 43/0864 370/241.1 |
| 2014/0029442 | A1* | 1/2014 | Wallman ................ H04L 69/22 370/241.1 |
| 2014/0098679 | A1 | 4/2014 | Baillargeon |
| 2014/0119221 | A1* | 5/2014 | Park ....................... H04L 43/16 370/252 |
| 2014/0169180 | A1 | 6/2014 | Wallman |
| 2014/0169183 | A1 | 6/2014 | Allan et al. |
| 2014/0226505 | A1* | 8/2014 | Sadek .................... H04J 3/1694 370/252 |
| 2014/0226507 | A1* | 8/2014 | Bonnier .................. H04L 43/08 370/252 |
| 2015/0058479 | A1* | 2/2015 | Kolhi .................. H04L 43/0811 709/224 |
| 2015/0109952 | A1 | 4/2015 | Baillargeon et al. |
| 2015/0333993 | A1* | 11/2015 | Welin ................. H04L 43/0882 370/252 |
| 2016/0014213 | A1 | 1/2016 | Ajitomi et al. |
| 2016/0026490 | A1* | 1/2016 | Johnsson ............ H04L 43/0864 718/1 |
| 2016/0028603 | A1* | 1/2016 | Chakrabarti ........ H04L 43/0852 370/252 |
| 2016/0028604 | A1* | 1/2016 | Chakrabarti ........ H04L 43/0852 370/252 |
| 2016/0073279 | A1* | 3/2016 | Johnsson ............ H04L 43/0882 370/252 |
| 2016/0191367 | A1* | 6/2016 | Mirsky ................... H04L 69/28 709/203 |
| 2016/0191632 | A1* | 6/2016 | Mirsky ................... H04L 69/28 709/224 |
| 2016/0248656 | A1* | 8/2016 | Anand ..................... H04L 47/22 |
| 2016/0330092 | A1 | 11/2016 | Wallman |
| 2016/0352865 | A1 | 12/2016 | Gupta et al. |
| 2016/0352866 | A1 | 12/2016 | Gupta et al. |
| 2017/0019323 | A1 | 1/2017 | Allan et al. |
| 2017/0289011 | A1* | 10/2017 | Johnsson ................ H04L 43/10 |
| 2017/0373950 | A1 | 12/2017 | Szilagyi et al. |
| 2018/0077032 | A1* | 3/2018 | Park ..................... H04L 41/5067 |
| 2018/0091603 | A1 | 3/2018 | Sarangapani et al. |
| 2018/0107577 | A1* | 4/2018 | Johnsson ............. G06F 11/3495 |
| 2018/0167294 | A1 | 6/2018 | Gupta et al. |
| 2018/0219758 | A1 | 8/2018 | Nydell |
| 2018/0288194 | A1 | 10/2018 | Gupta et al. |
| 2019/0280914 | A1* | 9/2019 | Menon ..................... H04L 47/29 |
| 2019/0280931 | A1* | 9/2019 | Menon ................ H04L 43/0817 |
| 2019/0296997 | A1* | 9/2019 | Menon ................ H04L 43/0864 |

FOREIGN PATENT DOCUMENTS

| | | |
|---|---|---|
| EP | 2765740 A1 | 8/2014 |
| EP | 3099016 A1 | 11/2016 |
| WO | 2013184846 A1 | 12/2013 |
| WO | 2014168530 A1 | 10/2014 |

OTHER PUBLICATIONS

Hedayat et al., "A Two-Way Active Measurement Protocol (TWAMP)," RFC 5357, Network Working Group, The Internet Society, Oct. 2008, 26 pp.

Mirsky et al., "UDP Port Allocation for the Receiver Port in Two-Way Active Measurement Protocol (TWAMP)," Network Working Group, Internet-Draft, Updates 5357, Jun. 14, 2016, 5 pp.

Perumal et al., "Network Address Translator (NAT) Considerations for IP Performance Metrics (IPPM) Active Measurement Protocols," Network Working Group, Internet-Draft, Jul. 6, 2016, 7 pp.

Response to Examination Report dated Dec. 6, 2017, from counterpart European Application No. 16170977.9, filed Apr. 6, 2018, 12 pp.

Response to the Communication dated Oct. 13, 2016, from counterpart European Application No. EP 16170977.9, filed on May 25, 2017, 9 pp.

Search Report from counterpart European Application No. 16170977.9, dated Aug. 9, 2016, 7 pp.

Shalunov et al., "A One-Way Active Measurement Protocol (OWAMP)," Network Working Group, RFC 4656, Sep. 2006, 56 pp.

Intent to Grant dated Aug. 6, 2018, from counterpart European Application No. 16170977.9, 80 pp.

Response to Extended Search Report dated Oct. 13, 2016, from counterpart European Application No. 16170977.9, filed May 25, 2017, 9 pp.

Prosecution History from U.S. Appl. No. 14/755,961, dated Oct. 2, 2015 through May 17, 2018, 139 pp.

First Office Action and Search Report, and translation thereof, from counterpart Chinese Application No. 2016103504165, dated Oct. 8, 2018, 12 pp.

Extended Search Report from counterpart European Application No. 18215281.9, dated Apr. 8, 2019, 7 pp.

Response to Extended Search Report dated Apr. 8, 2019, from counterpart European Application No. 18215281.9, filed Dec. 2, 2019, 16 pp.

* cited by examiner

| UNUSED (12 OCTETS) |
|---|
| MODES |
| CHALLENGE (16 OCTETS) |
| SALT (12 OCTETS) |
| COUNT (4 OCTETS) |
| MBZ (12 OCTETS) |

FIG. 9

| SKMC | REQUEST | MBZ (2 OCTETS) |
|---|---|---|
| HMAC (16 OCTETS) |||

FIG. 10

| SKMC | RESPONSE | MBZ (2 OCTETS) |
|---|---|---|
| NUMBER OF SERVICES SUPPORTED |||
| HMAC (16 OCTETS) |||

FIG. 11A

| SKMC | INDICATION | SERVICE ID |
|---|---|---|
| SERVICE IDENTIFICATION STRING (12 OCTETS) |||
| SUPPORTED BITMASK OF SERVICE KPIs FOR SERVICE (2 OCTETS) |||
| HMAC (16 OCTETS) |||

FIG. 11B

| SKMC | ACK | SERVICE ID |
|---|---|---|
| SERVICE IDENTIFICATION STRING (12 OCTETS) |||
| REQUESTED BITMASK OF SERVICE KPIs FOR SERVICE (2 OCTETS) |||
| HMAC (16 OCTETS) |||

FIG. 11C

| 5 | MBZ | IPVN | SENDER | RECEIVER |
|---|---|---|---|---|
| NUMBER OF SCHEDULE SLOTS ||||| 
| NUMBER OF PACKETS ||||| 
| SENDER PORT || | RECEIVER PORT || 
| SENDER ADDRESS ||||| 
| SENDER ADDRESS (cont.) or MBZ (12 OCTETS) ||||| 
| RECEIVER ADDRESS ||||| 
| RECEIVER ADDRESS (cont.) or MBZ (12 OCTETS) ||||| 
| SID (16 OCTETS) ||||| 
| PADDING LENGTH ||||| 
| START TIME ||||| 
| TIMEOUT (8 OCTETS) ||||| 
| TYPE-P DESCRIPTOR ||||| 
| OCTETS TO BE REFLECTED ||| PADDING LENGTH TO REFLECT || 
| SERVICE ID ||| MBZ (2 OCTETS) || 
| HMAC (16 OCTETS |||||

FIG. 12

| SEQUENCE NUMBER |  |
|---|---|
| TIMESTAMP | |
| ERROR ESTIMATE | MBZ |
| RECEIVE TIMESTAMP | |
| SENDER SEQUENCE NUMBER | |
| SENDER TIMESTAMP | |
| SEND ERROR ESTIMATE | MBZ |
| SENDER TTL | MBZ |
| BITMASK OF SERVICE KPIs MONITORED FOR SERVICE (2 OCTETS) | |
| PACKET PADDING | |

FIG. 14A

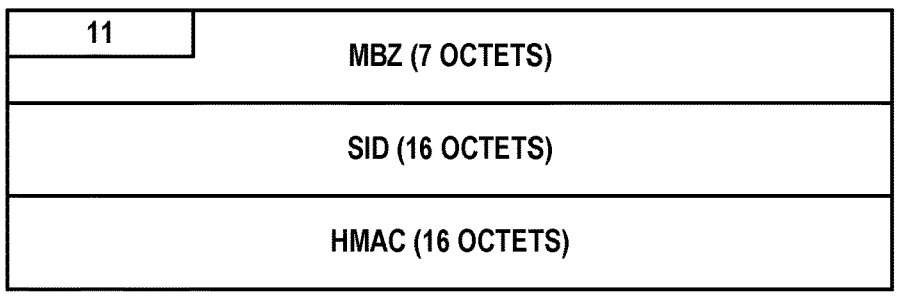

FIG. 17

| ACCEPT | SIZE | MBZ (2 OCTETS) |
|---|---|---|
| SID (16 OCTETS) ||| 
| HMAC (16 OCTETS) |||
| SEND ERROR EST. || RECEIVE ERROR EST. |
| SESSION SENDER SENDING TIMESTAMP |||
| SESSION SENDER RECEIVING TIMESTAMP |||
| SESSION REFLECTOR RECEIVING TIMESTAMP |||
| SESSION REFLECTOR SENDING TIMESTAMP |||
| SERVICE LATENCY MEASUREMENT SENDER TIMESTAMP |||
| SERVICE LATENCY MEASUREMENT RECEIVER TIMESTAMP |||
| NUMBER OF INGRESS SERVICE DATA PACKETS |||
| NUMBER OF EGRESS SERVICE DATA PACKETS |||

FIG. 18

MONITORING SERVICES KEY PERFORMANCE INDICATORS USING TWAMP FOR SDN AND NFV ARCHITECTURES

This application is a continuation of U.S. patent application Ser. No. 14/755,961, filed Jun. 30, 2015, which claims priority to India Patent Application No. 2616/CHE/2015, filed May 25, 2015, the entire contents of each of which are incorporated herein by reference.

TECHNICAL FIELD

The disclosure relates to communication networks.

BACKGROUND

Network architectures have been developed based on integrating software defined network (SDN) and network functions virtualization (NFV) concepts. SDN includes separation of the control plane and the data plane in network nodes similar to network devices, such as routers and switches, and the abstraction of the control plane into a more modular and layered architecture. NFV uses virtualization to remove dependency on specialized hardware and to consolidate many different network equipment types onto industry standard high volume servers, switches and storage, which may be located in data centers, network nodes and in the end user premises. In the SDN and NFV architecture, latency and load balancing are the two main challenges for deploying and migrating new and existing services.

SUMMARY

In general, techniques are described for extending a two-way active measurement protocol (TWAMP) to enable monitoring of service key performance indicators (KPIs) in a software defined network (SDN) and network function virtualization (NFV) architecture. In the SDN and NFV architecture, a TWAMP control client may be executed on a centralized controller, while a TWAMP session initiator and a TWAMP server may each be executed on a separate network device. The TWAMP extensions enable control messaging to be handled by the TWAMP control client, and data messaging to be handled by the TWAMP session initiator.

In addition, techniques are described for extending TWAMP to enable selecting and monitoring any of a plurality of service KPIs for a given service supported at a TWAMP server. The service KPIs may include one or more of keepalive measurements, round trip time measurements, path delay measurements, service latency measurements, or service load measurements. The TWAMP extensions for the service KPIs may be used in both conventional network architectures and in SDN and NFV architectures.

In one example, this disclosure is directed to a method comprising establishing a first control connection between a two-way active measurement protocol (TWAMP) control client on a centralized controller device of a network and a TWAMP server on a first network device in the network; establishing a second control connection between the TWAMP control client and a TWAMP session initiator on a second network device in the network; sending, by the TWAMP control client to the TWAMP server over the first control connection, a first set of TWAMP control messages to negotiate a data session for a given service supported at the TWAMP server, the negotiation including selecting one or more service key performance indicators (KPIs) to be measured for the given service; sending, by the TWAMP control client to the TWAMP session initiator over the second control connection, a second set of TWAMP control messages instructing the TWAMP session initiator to establish the data session for the given service with the TWAMP server; and receiving, by the TWAMP control client from the TWAMP session initiator over the second control connection, service data measurements for the selected service KPIs associated with the data session for the given service, wherein the service data measurements are collected by the TWAMP session initiator from the TWAMP server over the data session.

In another example, this disclosure is directed to a centralized controller device of a network, the centralized controller device comprising a memory, and one or more processors in communication with the memory and configured to execute a two-way active measurement protocol (TWAMP) control client. The TWAMP control client is configured to establish a first control connection with a TWAMP server on a first network device in the network; establish a second control connection with a TWAMP session initiator on a second network device in the network; send, to the TWAMP server over the first control connection, a first set of TWAMP control messages to negotiate a data session for a given service supported at the TWAMP server, the negotiation including selecting one or more service key performance indicators (KPIs) to be measured for the given service; send, to the TWAMP session initiator over the second control connection, a second set of TWAMP control messages instructing the TWAMP session initiator to establish the data session for the given service with the TWAMP server; and receive, from the TWAMP session initiator over the second control connection, service data measurements for the selected service KPIs associated with the data session for the given service, wherein the service data measurements are collected by the TWAMP session initiator from the TWAMP server over the data session.

In an additional example, this disclosure is directed to a method comprising establishing a control connection between a two-way active measurement protocol (TWAMP) control client on a centralized controller device of a network and a TWAMP session initiator on a first network device in the network; receiving, by the TWAMP session initiator from the TWAMP control client over the control connection, a set of TWAMP control messages instructing the TWAMP session initiator to establish a data session for a given service supported at a TWAMP server on a second network device in the network; establishing, by the TWAMP session initiator, the data session for the given service with the TWAMP server; receiving, by the TWAMP session initiator from the TWAMP server, service data measurements for one or more selected service key performance indicators (KPIs) to be measured for the given service over the data session; and sending, by the TWAMP session initiator to the TWAMP control client over the control connection, the service data measurements for the selected service KPIs associated with the data session for the given service.

In a further example, this disclosure is directed to a network device in a network, the network device comprising a memory, and one or more processors in communication with the memory and configured to execute a two-way active measurement protocol (TWAMP) session initiator. The TWAMP session initiator is configured to establish a control connection with a TWAMP control client on a centralized controller device of the network; receive, from the TWAMP control client over the control connection, a set of TWAMP control messages instructing the TWAMP session initiator to establish a data session for a given service supported at a TWAMP server on a second network device in the network; establish the data session for the given service with the TWAMP server; receive, from the TWAMP server, service data measurements for one or more selected service key performance indicators (KPIs) to be measured for the given service over the data session; and send, to the TWAMP control client over the control connection, the service data measurements for the selected service KPIs associated with the data session for the given service.

In another example, this disclosure is directed to a method comprising establishing a control connection between a two-way active measurement protocol (TWAMP) control client on a first network device in a network and a TWAMP server on a second network device in the network; negotiating, by the TWAMP control client, a data session for a given service supported at the TWAMP server, the negotiation including selecting one or more service key performance indicators (KPIs) to be measured for the given service; establishing, by the TWAMP control client, the data session for the given service with the TWAMP server; sending, by a TWAMP session initiator on a third network device in the network, one or more TWAMP test packets to the TWAMP server over the data session for the given service; and sending, by the TWAMP server in response to the one or more TWAMP test packets, service data measurements for the selected service KPIs for the given service over the data session to the TWAMP session initiator.

In an additional example, this disclosure is directed to a system comprising a first network device in a network including one or more processors configured to execute a two-way active measurement protocol (TWAMP) control client, a second network device in the network including one or more processors configured to execute a TWAMP server, and a third network device in the network including one or more processors configured to execute a TWAMP session initiator. The TWAMP control client on the first network device is configured to establish a control connection with the TWAMP server on the second network device, negotiate a data session for a given service supported at the TWAMP server, the negotiation including selecting one or more service key performance indicators (KPIs) to be measured for the given service, and establish the data session for the given service with the TWAMP server. The TWAMP session initiator on the third network device is configured to send one or more TWAMP test packets to the TWAMP server on the second network device over the data session for the given service, and the TWAMP server on the second network device is configured to, in response to the one or more TWAMP test packets, send service data measurements for the selected service KPIs for the given service over the data session to the TWAMP session initiator on the third network device.

In a further example, this disclosure is directed to a non-transitory computer-readable medium storing instructions that when executed cause one or more processors to establish a control connection between a two-way active measurement protocol (TWAMP) control client on a first network device in a network and a TWAMP server on a second network device in the network; negotiate, by the TWAMP control client, a data session for a given service supported at the TWAMP server, the negotiation including selecting one or more service key performance indicators (KPIs) to be measured for the given service; establish, by the TWAMP control client, the data session for the given service with the TWAMP server; send, by a TWAMP session initiator on a third network device in the network, one or more TWAMP test packets to the TWAMP server over the data session for the given service; and send, by the TWAMP server in response to the one or more TWAMP test packets, service data measurements for the selected service KPIs for the given service over the data session to the TWAMP session initiator.

The details of one or more examples are set forth in the accompanying drawings and the description below. Other features, objects, and advantages will be apparent from the description and drawings, and from the claims.

BRIEF DESCRIPTION OF DRAWINGS

FIGS. 9, 10, 11A-11C, and 12 are conceptual diagrams illustrating example formats of TWAMP control messages between a TWAMP control client and a TWAMP server, in accordance with the techniques of this disclosure. FIG. 9 illustrates an example format of a server greeting message sent by the TWAMP server to the TWAMP control client in response to a control connection initiated by the TWAMP control client. FIG. 10 illustrates an example format of a service monitoring request message sent by the TWAMP control client to the TWAMP server in response to a server start message sent by the TWAMP server to the TWAMP control client. FIGS. 11A-11C illustrate an example format of a service monitoring response message set sent between the TWAMP control client to the TWAMP server in response to a service monitoring request message (FIG. 10) sent by the TWAMP control client to the TWAMP server. FIG. 12 illustrates an example format of a request session message sent by the TWAMP control client to the TWAMP server to request a data session for a given service supported at the TWAMP server.

FIGS. 13A-13B and 14A-14B are conceptual diagrams illustrating example formats of TWAMP test packets between either a TWAMP control client or a TWAMP session initiator and a TWAMP server, in accordance with the techniques of this disclosure. FIG. 13A illustrates an example format of a TWAMP test packet for the unauthenticated mode sent by a session sender associated with either the TWAMP control client or the TWAMP session initiator to a session reflector associated with the TWAMP server over an established data session. FIG. 13B illustrates an example format of a TWAMP test packet for the authenticated and encrypted modes sent by the session sender associated with either the TWAMP control client or the TWAMP session initiator to the session reflector associated with the TWAMP server over an established data session. FIG. 14A illustrates an example format of a TWAMP test packet for the unauthenticated mode sent by the session reflector associated with the TWAMP server to the session sender associated with either the TWAMP control client or the TWAMP session initiator over an established data session. FIG. 14B illustrates an example format of a TWAMP test packet for the authenticated and encrypted modes sent by the session reflector associated with the TWAMP server to the session sender associated with either the TWAMP control client or the TWAMP session initiator over an established data session.

FIGS. 15-18 are conceptual diagrams illustrating example formats of TWAMP control messages between a TWAMP control client and a TWAMP session initiator, in accordance with the techniques of this disclosure. FIG. 15 illustrates an example format of a data session message sent by the TWAMP control client to the TWAMP session initiator instructing the TWAMP session initiator to establish a data session for a given service with the TWAMP server. FIG. 16 illustrates an example format of a delete data session message sent by the TWAMP control client to the TWAMP session initiator instructing the TWAMP session initiator to delete a data session for a given service with the TWAMP server. FIG. 17 illustrates an example format of a request service data message sent by the TWAMP control client to the TWAMP session initiator requesting service data measurements for one or more selected service KPIs associated with the established data session for the given service from the TWAMP session initiator. FIG. 18 illustrates an example format of an ACK message sent by the TWAMP session initiator to the TWAMP control client in response to receiving the request service data message (FIG. 17).

DETAILED DESCRIPTION

Figure 1:
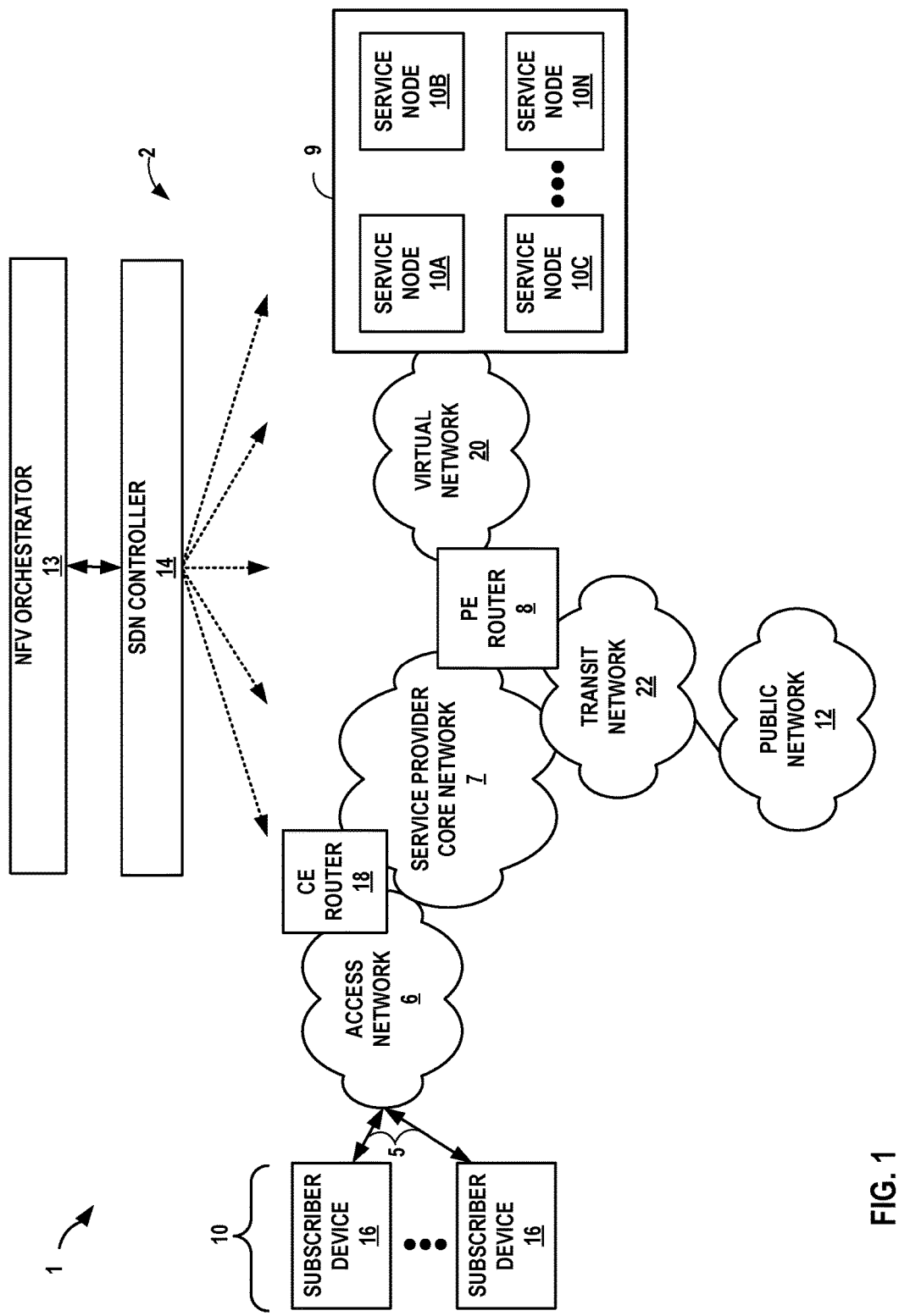
FIG. 1 is a block diagram illustrating an example network system including a software defined network (SDN) network and network function virtualization (NFV) based network architecture, in accordance with techniques described herein.

FIG. 1 is a block diagram illustrating an example network system including a software defined network (SDN) network and network function virtualization (NFV) based network architecture, in accordance with techniques described herein. The example network system 1 of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

As illustrated in FIG. 1, service provider network 2 comprises a software defined network (SDN) and network functions virtualization (NFV) architecture. SDN controller device 14 may provide a high-level controller for configuring and managing the routing and switching infrastructure of service provider network 2 (e.g., router 18, router 8, service provider core network 7, and data center 9). NFV orchestrator device 13 may provide a high-level orchestrator for configuring and managing virtualization of network services into service nodes 10A-10N (collectively "service nodes 10") of data center 9.

In some instances, SDN controller 14 manages deployment of virtual machines (VMs) within the operating environment of data center 9. For example, SDN controller 14 may interact with router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

In the example of FIG. 1, service provider network 2 comprises access network 6 that provides connectivity to public network 12 via service provider core network 7 (hereinafter, "core network 7") and a router 8. Core network 7 and public network 12 provide packet-based services that are available for request and use by subscriber devices 16. As examples, core network 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

Subscriber devices 16 can connect to router 8 via access network 6 to receive connectivity to subscriber services for applications hosted by service nodes 10. A subscriber may represent, for instance, an enterprise, a residential subscriber, or a mobile subscriber. Subscriber devices 16 may be, for example, personal computers, laptop computers or other types of computing devices associated with subscribers. In addition, subscriber devices 16 may comprise mobile devices that access the data services of service provider network 2 via a radio access network (RAN) (not shown).

Example mobile subscriber devices include mobile telephones, laptop or desktop computers having, e.g., a 3G wireless card, wireless-capable netbooks, video game devices, pagers, smart phones, personal data assistants (PDAs) or the like.

Each of subscriber devices 16 may run a variety of software applications, such as word processing and other office support software, web browsing software, software to support voice calls, video games, video conferencing, and email, among others. Subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric digital subscriber line (DSL) network, a Worldwide Interoperability for Microwave Access (WiMAX) network, a T-1 line, an Integrated Service Digital Network (ISDN), wired Ethernet, or a cellular radio link.

A network service provider operates, or in some cases leases, elements of access network 6 to provide packet transport between subscriber devices 16 and router 8. Access network 6 represents a network that aggregates data traffic from one or more of subscriber devices 16 for transport to/from core network 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Router 18 may be a customer edge (CE) router, a provider edge (PE) router, or other network device between access network 6 and core network 7. Core network 7 offers packet-based connectivity to subscriber devices 16 attached to access network 6 for accessing public network 12 (e.g., the Internet). Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent the Internet. Public network 12 may represent an edge network coupled to core network 7, e.g., by a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or other network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to access network 6, core network 7 may support multiple types of access network infrastructures that connect to service provider network access gateways to provide access to the offered services. In some instances, network system 1 may include subscriber devices 16 that attach to multiple different access networks 6 having varying architectures.

In general, any one or more of subscriber devices 16 may request authorization and data services by sending a session request to a gateway device such as router 18 or router 8. In turn, router 18 may access a central server (not shown) such as an Authentication, Authorization and Accounting (AAA) server to authenticate the one of subscriber devices 16 requesting network access. Once authenticated, any of subscriber devices 16 may send subscriber data traffic toward core network 7 in order to access and receive services provided by public network 12, and such packets may traverse router 8 as part of at least one packet flow. In some examples, router 18 may forward all authenticated subscriber traffic to public network 12, and router 8 may steer particular subscriber traffic to a data center 9 if the subscriber traffic requires services on service nodes 10. Applications (e.g., service applications) to be applied to the subscriber traffic may be hosted on service nodes 10.

As described herein, service provider network 2 includes a data center 9 having a cluster of service nodes 10 that provide an execution environment for the mostly virtualized network services. In some examples, each of service nodes 10 represents a service instance. Each of service nodes 10 may apply one or more services. As examples, service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

Although illustrated as part of data center 9, service nodes 10 may be network devices coupled by one or more switches or virtual switches of core network 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card or other network element or component.

Router 8 may steer individual subscriber packet flows through defined sets of services provided by service nodes 10. That is, in some examples, each subscriber packet flow may be forwarded through a particular ordered combination of services provided by service nodes 10, each ordered set being referred to herein as a "service chain." In the example of FIG. 1, subscriber packet flows may be directed along a service chain that includes any of service nodes 10. A particular service node 10 may support multiple service chains. Once processed at a terminal node of the service chain, i.e., the last service node 10 to apply services to packets flowing along a particular service path, the terminal node may direct the traffic back to router 8 for further processing and/or forwarding to public network 12. For example, traffic engineered service paths may start and terminate with router 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after router 18 has authenticated and established access sessions for the subscribers, router 18 or router 8 may direct packet flows for the subscribers along the appropriate service tunnels, thereby causing data center 9 to apply the requisite ordered services for the given subscriber. In some examples, SDN controller 14 may also provide a forwarding rule set to router 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow long the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

A two-way active measurement protocol (TWAMP) may be used within service provider network 2 to provide both one-way and two-way or round trip measurement capabilities between network devices. TWAMP includes TWAMP control messages used to initiate, start and stop test sessions between a TWAMP control client and a TWAMP server, and TWAMP data messages used to exchange test packets between a TWAMP session sender associated with the TWAMP control client and a TWAMP session reflector associated with the TWAMP server. As an example, TWAMP may be used to measure two-way metrics, such as round trip time (RTT), for one or more services along a service tunnel or service path associated with a particular service chain. TWAMP is described in more detail in RFC 5357 (Hedayat, et al., "A Two-Way Active Measurement Protocol (TWAMP)," Internet Engineering Task Force (IETF), Network Working Group, RFC 5357, October 2008), the entire content of which is incorporated herein by reference.

In the SDN and NFV architecture illustrated in FIG. 1, latency and load balancing are two main challenges for deploying and migrating new and existing services provided by service nodes 10. The techniques described in this disclosure include a solution for calculating service latency and service load, as well as other service key performance indicators (KPIs), in service provider network 2 by providing extensions to TWAMP to support measurement of a plurality of service KPIs, and further providing extensions to TWAMP to operate within a SDN and NFV architecture.

In one example, this disclosure describes techniques for extending TWAMP to enable selecting and monitoring any of a plurality of service KPIs for a given service supported at a TWAMP server. The service KPIs may include, for example, one or more of keepalive or liveliness of service measurements, RTT measurements, path delay measurements, service latency measurements, or service load measurements in terms of number of packet flows, number of sessions, number of subscribers, or number of octets. Monitoring service latency using TWAMP is described in more detail in U.S. application Ser. No. 14/573,167, filed Dec. 17, 2014, the entire content of which is incorporated herein by reference.

As described above, the services may include layer 4 to layer 7 services, such as SFW, DPI, CGNAT and TDF. Additionally, these services may refer to applications such as domain name service (DNS) applications, hypertext transfer protocol (HTTP) applications, and file transfer protocol (FTP) applications. In some examples, the disclosed TWAMP extensions may be used to measure service latency of DPI, a number of CGNAT flows, a number of TDF subscribers, or the liveliness of a DNS server or HTTP server.

The disclosed TWAMP extensions include extensions to TWAMP control messages used to select one or more of the service KPIs to be measured for a given service, and extensions to TWAMP data messages used to transmit service data measurements for the selected service KPIs over a data session for the given service. Conventionally, the TWAMP test protocol packet format has padding octets that are not used (e.g., either set to zero or random values). According to the disclosed techniques, these padding octets may be used to carry service data measurements for one or more service KPIs for a given service between a session sender associated with either a TWAMP control client or a TWAMP session initiator and a session reflector associated with a TWAMP server.

In some examples, a single TWAMP control connection between a TWAMP control client and a TWAMP server may be used to establish multiple TWAMP data or test sessions to measure service KPIs for multiple services in service provider network 2. In general, one TWAMP data or test session may be used to monitor service KPIs for a given service, but multiple service KPIs may be monitored using the single data session for the given service. The disclosed TWAMP extensions may be used to monitor service KPIs for a standalone service or a set of services. The TWAMP extensions for the service KPIs may be used in both conventional network architectures and in SDN and NFV architectures.

In another example, this disclosure describes techniques for extending TWAMP to enable monitoring of service KPIs in the SDN and NFV architecture. Conventionally, a TWAMP control client may include a TWAMP session sender such that the TWAMP control client handles all control and test data messaging, using the session sender to exchange the TWAMP test packets with the TWAMP server in order to measure the two-way metrics. By moving the TWAMP control client into a centralized controller, e.g., SDN controller 14, however, separation of the TWAMP control messaging and TWAMP data messaging may be necessary.

In the SDN and NFV architecture illustrated in FIG. 1, a TWAMP control client (not shown) may be executed on SDN controller 14, while a TWAMP session initiator (not shown) and a TWAMP server (not shown) may each be executed on a separate network device. As one example, the TWAMP session initiator may be executed on router 8, and the TWAMP server may be executed on one of service nodes 10.

The disclosed TWAMP extensions enable the control messaging to be handled by the TWAMP control client on SDN controller 14, and the data messaging to be handled by the TWAMP session initiator, e.g., on router 8. The disclosed TWAMP extensions enable measurement of important service KPIs for services and subscriber related attributes in the SDN and NFV architecture. For example, the service latency measurements and the service load measurements may be especially useful in the SDN and NFV architecture.

The disclosed TWAMP extensions may include an additional set of TWAMP control messages used by the TWAMP control client, e.g., on SDN controller 14, to instruct the TWAMP session initiator, e.g., on router 8, to measure service KPIs for one or more services over data sessions established with the TWAMP server, e.g., on service node 10A. In this way, the control client and session initiator may run on different devices, e.g., on SDN controller 14 and router 8, respectively, and communicate data to SDN controller 14. This data, which may include the measured service KPIs such as service latency and service load, may be used by SDN controller 14 and/or NFV orchestrator 13 for traffic engineering and optimization of services traffic in terms of latency and load balancing.

In accordance with the TWAMP extensions including the new set of control messages between the TWAMP control client and the TWAMP session initiator, the TWAMP control client, e.g., on SDN controller 14, is responsible for establishing control connections with both the TWAMP server, e.g., on service node 10A, and the TWAMP session initiator, e.g., on router 8. The TWAMP control client negotiates a data session for a given service with the TWAMP server, and then uses the new set of control messages to instruct the TWAMP session initiator to establish the data session for the given service with the TWAMP server in order to collect service data measurements for the service KPIs.

The techniques of this disclosure may provide several benefits. As one example, the techniques provide benefits of both a distributed architecture and a centralized architecture as the TWAMP control client is running on a single node, e.g., SDN controller 14, and the TWAMP session initiator may be running on multiple network devices or VMs. In some examples, all of the data collected by the TWAMP session sender associated with the TWAMP session initiator from across different network devices or VMs may be sent to the centralized TWAMP control client. As another example benefit, the disclosed techniques are easy to manage. For example, SDN controller 14 configures one or more network devices to run the TWAMP session initiator, e.g., router 8, and the TWAMP server, e.g., one or more of service nodes 10. Once configured, the configured network devices may calculate the service KPIs.

As a further example benefit, calculation of multiple service KPIs in real time may give a very accurate estimation of service performance in terms of service latency and service load. The centralized TWAMP control client may use received service data measurements to calculate one or more service KPIs, and send the service data measurements and/or the calculated service KPIs to a data collection application (not shown) on SDN controller 14. SDN controller 14 may then communicate the data to NFV orchestrator 13, which may use the data to optimize the performance of the services. As another example benefit, the disclosed techniques are open to any customer in a SDN and NFV based architecture. In some examples, the disclosed techniques may be applicable to all new and existing customers in the SDN and NFV based architecture, as illustrated in FIG. 1, for active measurement of service KPIs between any two nodes in service provider network 2. The measurements of the service KPIs may be carried out between different network nodes or between two compute nodes.

Some of the major service KPIs that may be measured according to the disclosed techniques will now be explained. A round trip time (RTT) measurement may be calculated between any two nodes in service provider network 2 in order to check the delay in a specific packet path. For example, these nodes may be two compute nodes, one compute node and one service node, or two service nodes that are geographically separate. Service latency and service load measurements may be calculated for any service provided by service nodes 10. The service may be running on VMs of service nodes 10, or running on a physical chassis of service nodes 10 or data center 9. Path delay measurements may be calculated between geographically separated VMs running the same services and having the same termination point. The path delay measurement may help in managing VMs running the same services to scale up and scale down based on the path delay.

Several example use cases are described below with respect to FIGS. 2-4 in order to explain the disclosed techniques in different deployment scenarios. An example message sequence including the new set of TWAMP control messages for the SDN and NFV architecture is described below with respect to FIG. 5. In addition, example formats for the new TWAMP control and data messages are described below with respect to FIGS. 9, 10, 11A-11C, 12, 13A-13B, 14A-14B, and 15-18.

Figure 2:
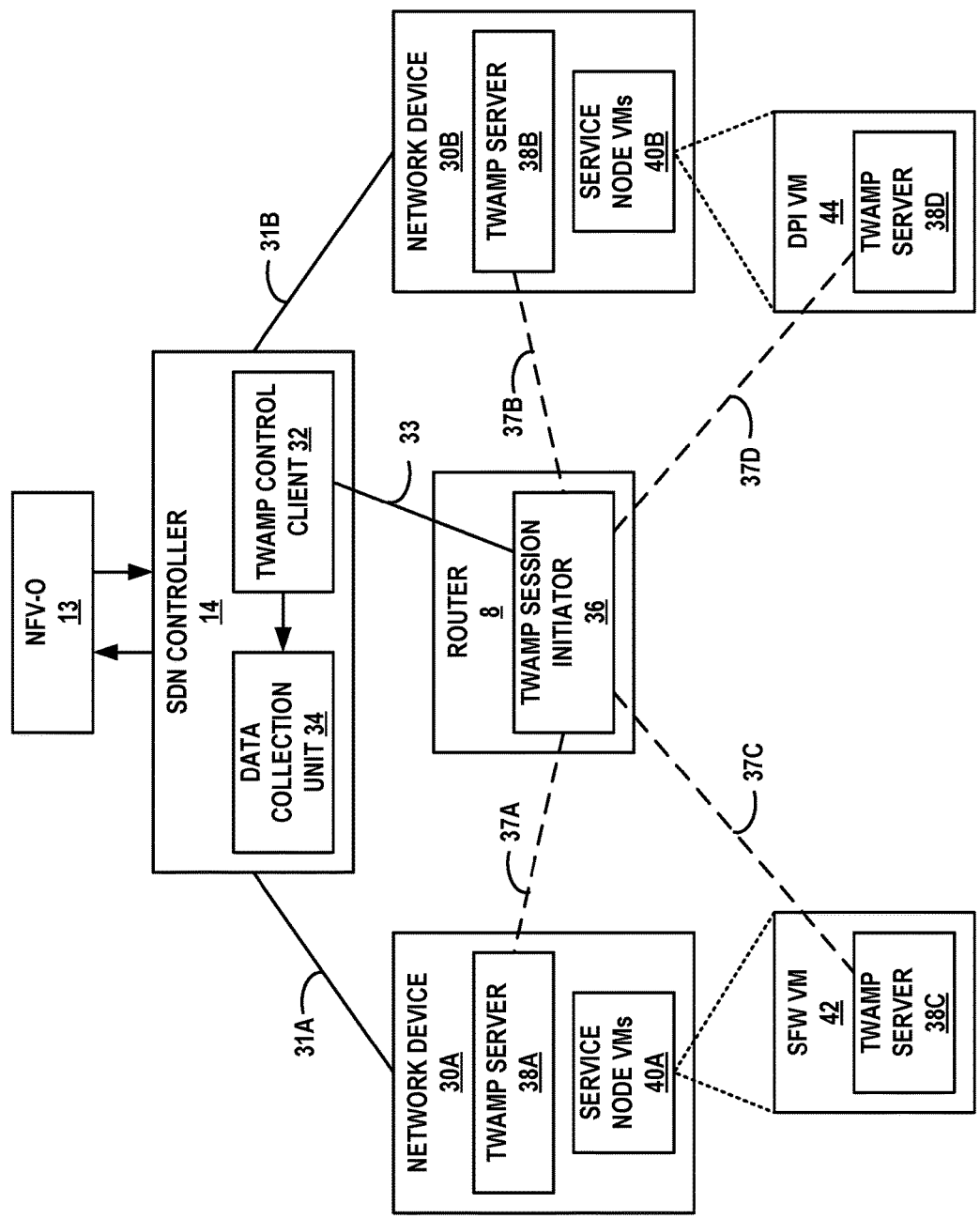
FIG. 2 is a block diagram illustrating an example of performing a service latency measurement in a SDN and NFV based network architecture using TWAMP extensions, in accordance with the techniques of this disclosure.

FIG. 2 is a block diagram illustrating an example of performing a service latency measurement in a SDN and NFV based network architecture using TWAMP extensions, in accordance with the techniques of this disclosure. SDN controller 14, NFV-O 13, and router 8 illustrated in FIG. 2 operate as described above with respect to FIG. 1.

In the example illustrated in FIG. 2, SDN controller 14 includes a TWAMP control client 32 and a data collection unit 34, router 8 includes a TWAMP session initiator 36, and network devices 30A-30B (collectively "network devices 30") respectively include service node VMs 40A-40B (collectively "service node VMs 40"). In the illustrated example, service node VMs 40 may comprise a stateful firewall (SFW) VM 42 and a deep packet inspection (DPI) VM 44. Each of network devices 30 and service node VMs 40 may include one of TWAMP servers 38A-38D (collectively "TWAMP servers 38"). In some examples, each of network devices 30 may be one of service nodes 10 in data center 9 from FIG. 1. In other examples, each of network devices 30 may be a router, switch or other network device within data center 9 that is configured to execute a VM for one of service nodes 10.

In accordance with the techniques of this disclosure, TWAMP control client 32, TWAMP session initiator 36, and any of TWAMP servers 38 may be configured to calculate service latency within the network. The detailed steps are presented below.

In a first step, NFV-O 13 communicates the configuration for TWAMP control client 32 and TWAMP servers 38 to SDN controller 14. NFV-O 13 may push the configuration information to SDN controller 14 using representational state transfer (REST) application programming interfaces (APIs). In other examples, any other southbound interface may be used between NFV-O 13 and SDN controller 14 to communicate the configuration information.

In a second step, SDN controller 14 communicates with one or more underlying physical devices of TWAMP servers 38. As illustrated in FIG. 2, SDN controller 14 is connected to network devices 30A, 30B via respective links 31A, 31B. SDN controller 14 may communicate with each of network devices 30 over links 31A, 31B using an Extensible Messaging and Presence Protocol (XMPP) interface or any other open source protocol. Each of network devices 30 may be a router, switch or any other physical device in the network.

TWAMP control client 32, running on SDN controller 14 or as a separate process, establishes a control connection with each of TWAMP servers 38 running on network devices 30. TWAMP control client 32 may establish the control connections using, e.g., a transmission control protocol (TCP). TWAMP control client 32 and each of TWAMP servers 38 may then negotiate a respective one of data sessions 37A-37D (collectively "data sessions 37") for a given service supported at the TWAMP server. As an example, TWAMP control client 32 and at least one of TWAMP servers 38, e.g., TWAMP server 38A, may negotiate data session 37A, including a mode for data session 37A, a service identifier (ID) for the given service supported at TWAMP server 38A, a session identifier (SID) for data session 37A, and one or more selected service KPIs to be measured for the given service over data session 37A.

In a third step, TWAMP control client 32, running on SDN controller 14 or as a separate process, communicates with TWAMP session initiator 36 running on router 8 using a new set of TWAMP control messages, in accordance with the techniques of this disclosure. In the illustrated example, TWAMP control client 32 may establish a control connection 33 with TWAMP session initiator 36, e.g., using TCP. Continuing the above example, TWAMP control client 32 may send the new set of TWAMP control messages instructing TWAMP session initiator 36 to establish data session 37A for the given service with TWAMP server 38A. The new set of TWAMP control messages may include at least some of the information negotiated between TWAMP control client 32 and TWAMP server 38A, such as the SID to identify data session 37A and receiver port and address information for TWAMP server 38A.

In a fourth step, in response to the new set of TWAMP control messages from TWAMP control client 32, TWAMP session initiator 36 establishes data session 37A with TWAMP server 38A running on a physical chassis of network device 30A. In another example, TWAMP session initiator 36 may establish data session 37C with TWAMP server 38C running on SFW VM 42 of network device 30A.

In a fifth step, TWAMP session initiator 36 uses data session 37A for calculating the selected service KPIs for the given service, e.g., SFW, that is hosted on network device 30A on which TWAMP server 38A is running. As an example, TWAMP session initiator 36 may send TWAMP test packets to TWAMP server 38A over data session 37A, and receive a TWAMP test packet back from TWAMP server 38A that includes a list of the selected service KPIs included in the TWAMP test packet and service data measurements for the selected service KPIs associated with data session 37A for the given service.

In accordance with the techniques of this disclosure, TWAMP server 38A sends the service data measures for the selected service KPIs to TWAMP session initiator 36 included in one of a packet padding area, a service protocol data unit (PDU), a service data unit (SDU), or a header of a TWAMP test packet. More specifically, TWAMP server 38A may send TWAMP test packets with padding areas that include timestamps in order to calculate service latency.

In a sixth step, TWAMP session initiator 36 forwards the service data measurements for the selected service KPIs to TWAMP control client 32. TWAMP control client 32 may calculate the service KPIs, e.g., service latency, based on the received service data measurements, e.g., timestamps, for the given service. In some examples, TWAMP session initiator 36 may forward the service data measurements for the selected service KPIs to TWAMP control client 32 in response to an explicit request from TWAMP control client 32. In other examples, TWAMP session initiator 36 may periodically forward the service data measurements for the selected service KPIs to TWAMP control client 32.

In a seventh step, TWAMP control client 32 sends the service data measurements and/or the calculated service KPIs to data collection unit 34 within SDN controller 14. This is implementation specific and may be designed as per the network layout of SDN controller 14. For example, there may be a proprietary interface between TWAMP control client 32 and data collection unit 34. In some examples, data collection unit 34 may comprise a memory, which may be formed by any of a variety of memory devices, such as dynamic random access memory (DRAM), including synchronous DRAM (SDRAM), magnetoresistive RAM (MRAM), resistive RAM (RRAM), or other types of memory devices.

In an eighth step, data collection unit 34 on SDN controller 14 communicates the service data measurements and/or calculated service KPIs from TWAMP control client 32 to NFV-O 13. NFV-O 13 may perform real-time analysis of network nodes and services running in the network based on the received information. In this way, NFV-O 13 may use the calculated service KPIs to manage the network in order to optimize network resources with respect to service latency.

Figure 3:
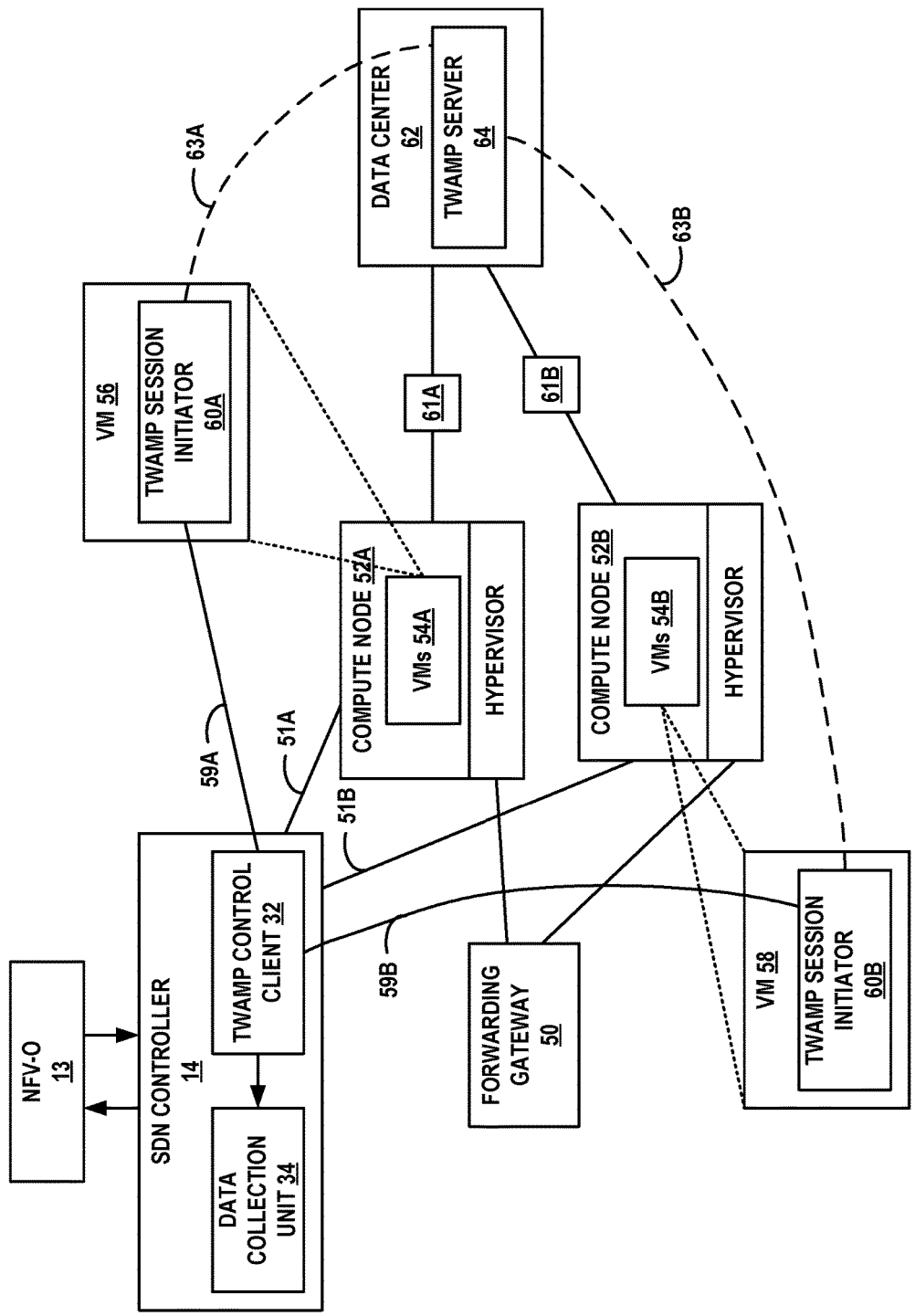
FIG. 3 is a block diagram illustrating an example of performing a round trip time measurement for geographically separated virtual machines (VMs) in a SDN and NFV based network architecture using TWAMP extensions, in accordance with the techniques of this disclosure.

FIG. 3 is a block diagram illustrating an example of performing a RTT measurement for geographically separated VMs in a SDN and NFV based network architecture using TWAMP extensions, in accordance with the techniques of this disclosure. SDN controller 14 and NFV-O 13 illustrated in FIG. 3 operate as described above with respect to FIG. 1.

In the example illustrated in FIG. 3, SDN controller 14 includes a TWAMP control client 32 and a data collection unit 34, and a data center 62 includes a TWAMP server 64. In some examples, data center 62 may operate similar to data center 9 from FIG. 1. TWAMP server 64 may be executed on a physical chassis of a network device within data center 62, or on a VM of the network device within data center 62.

The illustrated network further includes compute nodes 52A, 52B that are connected to SDN controller 14 via respective links 51A, 51B. In addition, compute nodes 52A, 52B are connected to data center 62 via respective underlying gateway devices 61A, 61B. Compute nodes 52A, 52B may be controlled, managed or configured by forwarding gateway 50. In some examples, router 8 from FIG. 1 may operate as forwarding gateway 50. Compute nodes 52A, 52B include hypervisors that provide an operating environment for respective VMs 54A, 54B. In the illustrated example, VMs 54A include VM 56 configured to execute TWAMP session initiator 60A, and VMs 54B include VM 58 configured to execute TWAMP session initiator 60B.

In accordance with the techniques of this disclosure, TWAMP control client 32, TWAMP session initiators 60A, 60B, and TWAMP server 64 may be configured to calculate RTT measurements within the network. The detailed steps are the substantially the same as discussed above with respect to FIG. 2, except TWAMP server 64 may send TWAMP test packets with padding areas that include timestamps in order to calculate round trip time.

For example, TWAMP control client 32 may establish a control connection with TWAMP server 64, and respective control connections 59A, 59B with TWAMP session initiators 60A, 60B. TWAMP control client 32 may then negotiate a data session for a given service with TWAMP server 64. In accordance with the techniques of this disclosure, TWAMP control client 32 then uses the new set of TWAMP control messages to instruct TWAMP session initiator 60A to establish data session 63A with TWAMP server 64, and similarly instruct TWAMP session initiator 60B to establish data session 63B with TWAMP server 64. In some cases, each of data sessions 63A, 63B may be established to calculate RTT measurements for the same type of service. In further accordance with the techniques of this disclosure, TWAMP server 64 sends TWAMP test packets with padding areas that include timestamps for the RTTs to TWAMP session initiators 60A, 60B. TWAMP session initiators 60A, 60B send the timestamps to TWAMP control client 32 on SDN controller 14, and SDN controller 14 then communicates the timestamps and/or calculated RTTs to NFV-O 13 via data collection unit 34.

Figure 4:
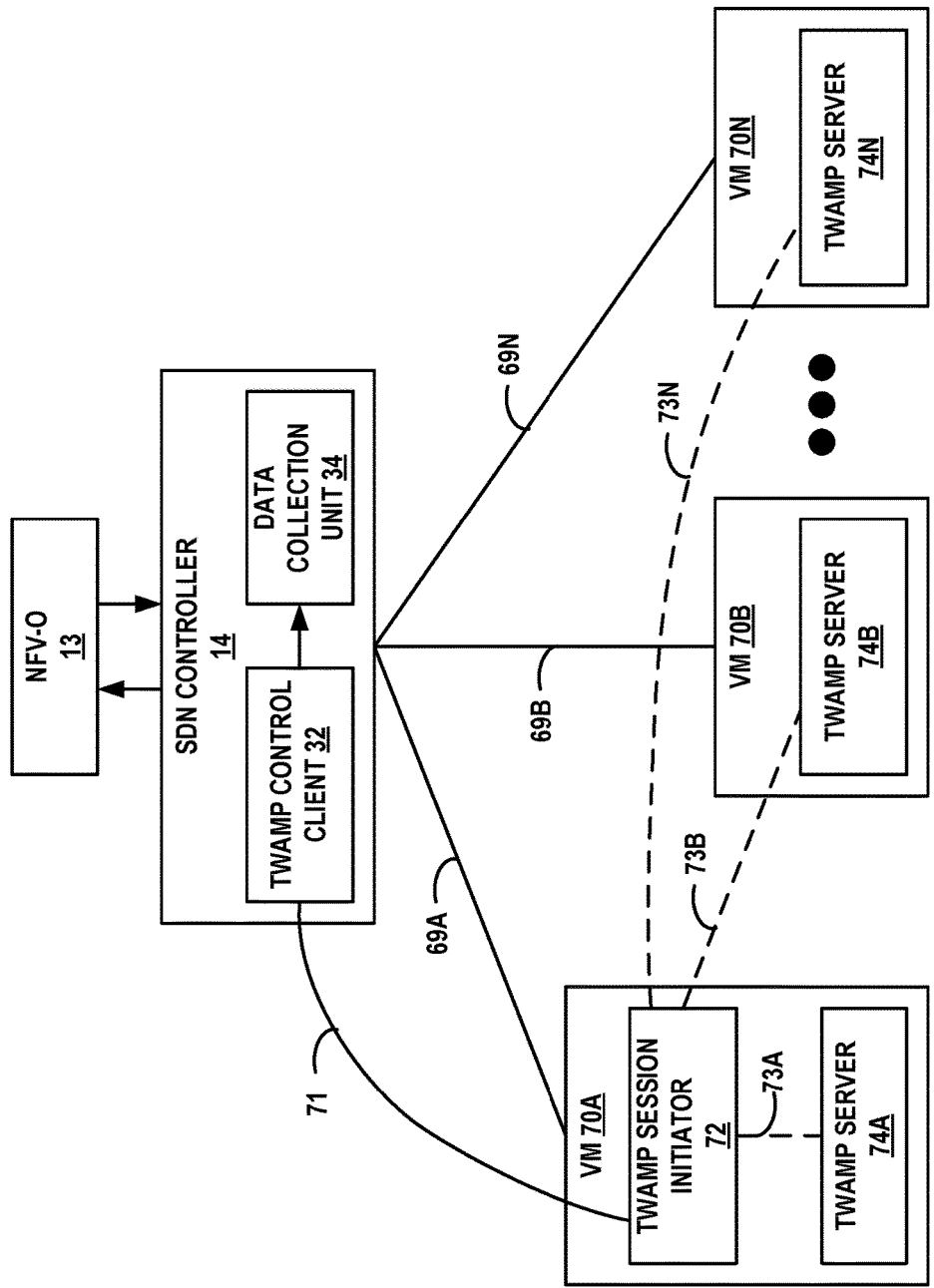
FIG. 4 is a block diagram illustrating an example of measuring selected service key performance indicators (KPIs) across virtual machines (VMs) in a SDN and NFV based network architecture using TWAMP extensions, in accordance with the techniques of this disclosure.

FIG. 4 is a block diagram illustrating an example of measuring selected service KPIs across VMs in a SDN and NFV based network architecture using TWAMP extensions, in accordance with the techniques of this disclosure. SDN controller 14 and NFV-O 13 illustrated in FIG. 4 operate as described above with respect to FIG. 1.

In the example illustrated in FIG. 4, SDN controller 14 includes a TWAMP control client 32 and a data collection unit 34, a first VM 70A includes a TWAMP session initiator 72 and a first TWAMP server 74A, a second VM 70B includes a second TWAMP server 74B, and a third VM 70N includes a third TWAMP server 74N. In other examples, the illustrated network may include more than three VMs, each including a TWAMP server. SDN controller 14 is connected to each of VMs 70A-70N (collectively "VMs 70") via respective links 69A-69N (collectively "links 69"). In some examples, VMs 70 may all be executed on the same underlying physical device, e.g., router 8 from FIG. 1, or the same collection of underlying physical devices, e.g., data center 10 from FIG. 1. In another example, one or more of VMs 70 may each be executed on separate network devices. In this example, first VM 70A may be executed on router 8 from FIG. 1, and each of second VM 70B and third VM 70N may be executed on one or more of service nodes 10 or other physical devices of data center 9 from FIG. 1.

In accordance with the techniques of this disclosure, TWAMP control client 32, TWAMP session initiator 73, and TWAMP servers 74A-74N (collectively "TWAMP servers 74") may be configured to calculate any of a plurality of service KPIs, such as service traffic load, service latency, and RTT measurements, for services within the network. The detailed steps are the substantially the same as discussed above with respect to FIG. 2, except each of TWAMP servers 74 may send TWAMP test packets with padding areas that include one or more of timestamps, number of packet flows, number of sessions, number of subscribers, or number of octets in order to calculate latency, round trip time or traffic load.

For example, TWAMP control client 32 may establish a control connection with each of TWAMP server 74, and a control connection 71 with TWAMP session initiator 72. TWAMP control client 32 may then negotiate a data session for a given service with each of TWAMP servers 74. In accordance with the techniques of this disclosure, TWAMP control client 32 then uses the new set of TWAMP control messages to instruct TWAMP session initiator 72 to establish data session 73A with TWAMP server 74A, establish data session 73B with TWAMP server 74B, and establish data session 73N with TWAMP server 74N. In some cases, each of data sessions 73A, 73B, 73N may be established to calculate one or more service KPIs for the same type of service. In further accordance with the techniques of this disclosure, each of TWAMP servers 74 sends TWAMP test packets with padding areas that include service data measurements, e.g., one or more of timestamps, number of packet flows, number of sessions, number of subscribers, or number of octets, for selected service KPIs to TWAMP session initiator 72. TWAMP session initiator 72 sends the service data measurements to TWAMP control client 32 on SDN controller 14, and SDN controller 14 then communicates the service data measurements and/or calculated service KPIs to NFV-O 13 via data collection unit 34.

Figure 5:
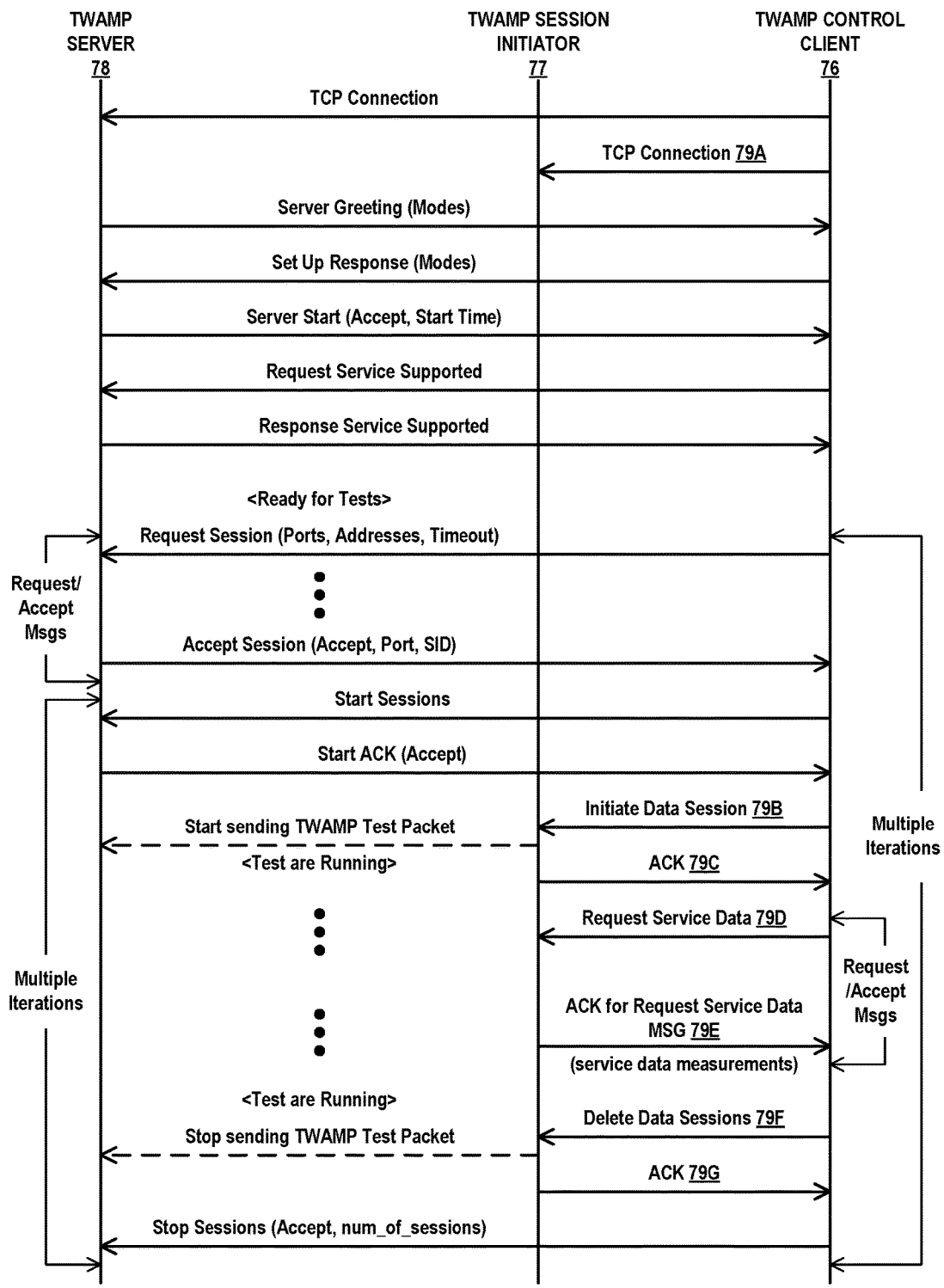
FIG. 5 is a block diagram illustrating an example message sequence between a TWAMP control client, a TWAMP session initiator, and a TWAMP server using TWAMP extensions, in accordance with the techniques of this disclosure.

FIG. 5 is a block diagram illustrating an example message sequence between a TWAMP control client 76, a TWAMP session initiator 77, and a TWAMP server 78 using TWAMP extensions, in accordance with the techniques of this disclosure. The TWAMP extensions include a new set of control messages 79A-79G (collectively "set of control messages 79") between TWAMP control client 76 and TWAMP session initiator 77. The TWAMP extensions further include modifications to existing control messages between TWAMP control client 76 and TWAMP server 78, and modifications to existing data messages between a session sender associated with either TWAMP control client 76 or TWAMP session initiator 77 and TWAMP server 78.

For example, as illustrated in FIG. 5, TWAMP control client 76 sends a control message to establish a first TCP control connection with TWAMP server 78 and also sends a control message 79A to establish a second TCP control connection with TWAMP session initiator 77. As a further example, as illustrated in FIG. 5, TWAMP control client 76 and TWAMP server 78 exchange a first set of control messages to negotiate one or more data sessions for one or more services supported at TWAMP server 78. In the illustrated example, the first set of control messages may include a server greeting message, a set up response message, a server start message, a request service supported message, a response service supported message, a plurality of request session messages and accept session messages, a start session message, and a start acknowledgment (ACK) message. In other examples, the first set of control messages may include more or fewer control messages that may convey similar or different control information to negotiate the data sessions.

The disclosed TWAMP extensions include modification to one or more of the messages included in the first set of control messages in order to negotiate measurement of any of a plurality of service KPIs over the data sessions. For example, the control messages may be modified to negotiate one or more of the mode for each data session indicating whether service KPIs monitoring is supported, the services supported at TWAMP server 78, a service ID used to identify each of the supported services, the service KPIs supported for each service ID, the selected service KPIs from among the supported service KPIs for each service ID, and a SID used to identify each accepted data session. The TWAMP extensions to control messages between TWAMP control client 76 and TWAMP server 78 are described in more detail below with respect to FIGS. 9, 10, 11A-11C, and 12.

According to the techniques of this disclosure, TWAMP control client 76 negotiates a data session for a given service with TWAMP server 78, and then uses a second set of control messages to instruct TWAMP session initiator 77 to establish the data session for the given service with TWAMP server 78 in order to collect service data measurements for the selected service KPIs for the given service. As illustrated in FIG. 5, the second set of control messages may include an initiate data session message 79B, an ACK message 79C for the initiate data session message, a plurality of request service data messages 79D and ACK messages 79E for the request service data messages, a delete data session message 79F, and a ACK message 79G for the delete data session message. In other examples, the second set of control messages may include more or fewer control messages that may convey similar or different control information to instruct establishment of data sessions and service data measurements over the established data sessions.

The disclosed TWAMP extensions include new control messages used by TWAMP control client 76 to instruct TWAMP session initiator 77 to handle the TWAMP data messaging. In this way, control client 76 and session initiator 77 may run on different devices. For example, the new control messages sent by TWAMP control client 76 to instruct TWAMP session initiator 77 to establish a data session for a given service may include one or more of a SID used to identify the data session, sender port and address information for TWAMP session initiator 77, and receiver port and address information for TWAMP server 78. At least some of this information may be learned by TWAMP control client 76 during the negotiation of the data session with TWAMP server 78. In some examples, the new control message sent by TWAMP control client 76 may also include an explicit request for service data measurements for selected service KPIs associated with the data session for the given service from TWAMP session initiator 77. The TWAMP extensions for the new set of control messages between TWAMP control client 76 and TWAMP session initiator 77 are described in more detail below with respect to FIGS. 15-18.

As another example, as illustrated in FIG. 5, TWAMP session initiator 77 and TWAMP server 78 exchange TWAMP test packets over a data session for a given service. The disclosed TWAMP extensions include modification to the TWAMP test packets in order to carry service data measurements for one or more selected KPIs associated with the data session for the given service. According to the disclosed techniques, the service data measurements for the selected service KPIs associated with the data session for the given service may be included in one of a packet padding area, a service PDU, a SDU, or a header of the TWAMP test packet. The extended TWAMP test packets may be sent by TWAMP server 78 to a session sender associated with TWAMP session initiator 77 (as illustrated in FIG. 5) or to a session sender associated with TWAMP control client 76. The TWAMP extensions to test packets between a session sender associated with either TWAMP control client 76 or TWAMP session initiator 77 and TWAMP server 78 are described in more detail below with respect to FIGS. 13A-13B and 14A-14B.

Figure 6:
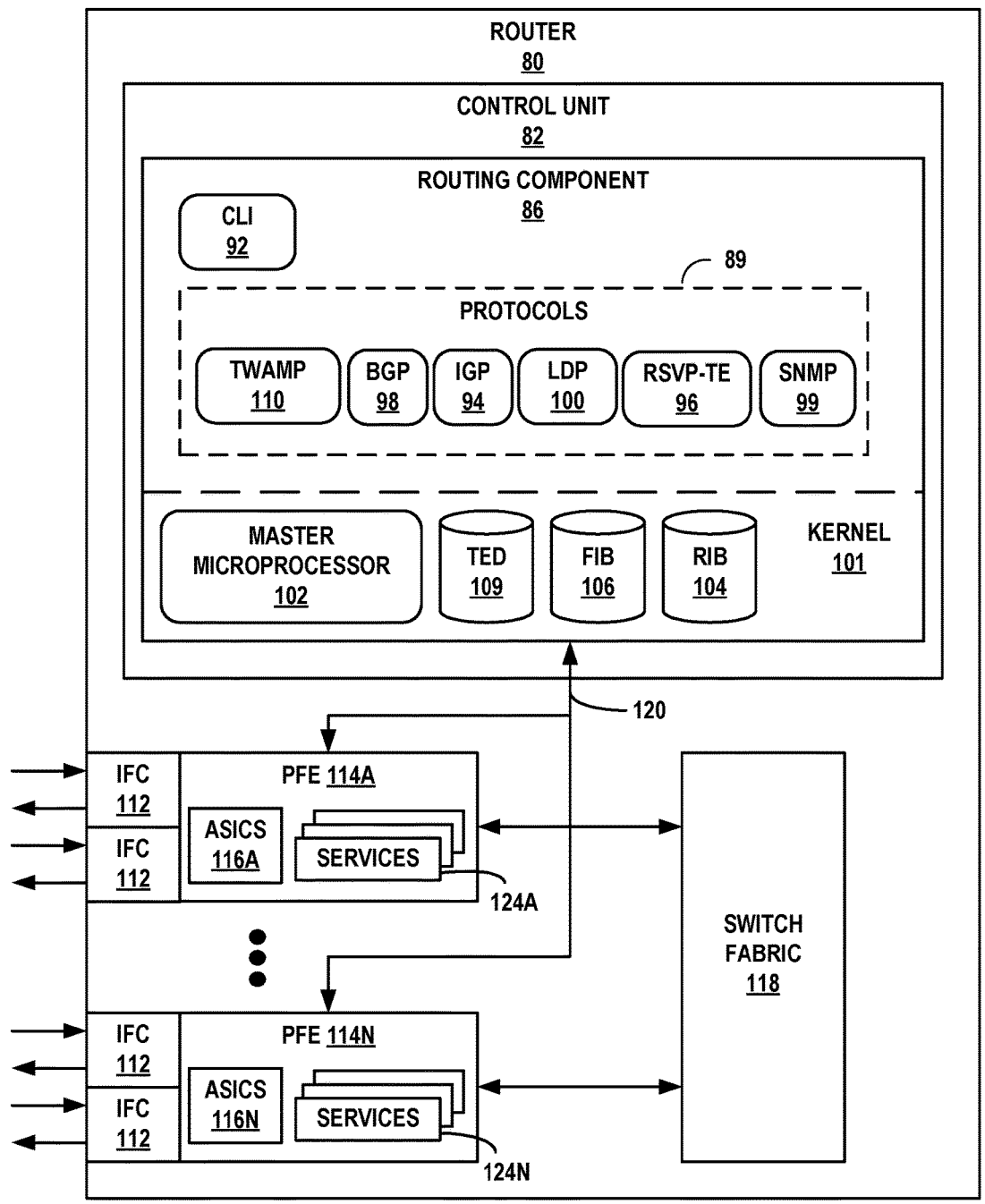
FIG. 6 is a block diagram illustrating an example router configured to execute a TWAMP session initiator, in accordance with the techniques of this disclosure.

FIG. 6 is a block diagram illustrating an example router 80 configured to execute a TWAMP session initiator, in accordance with the techniques of this disclosure. For purposes of illustration, router 80 may be described herein within the context of service provider network 2 of FIG. 1, and may represent any of router 18 or router 8, for example. Moreover, while described with respect to a particular network device, e.g., a router, the techniques may be implemented by any network device that may operate as a service endpoint, such as a Layer 3 (L3) or L2/L3 switch or server.

In the example of FIG. 6, router 80 includes control unit 82 in which routing component 86 provides control plane functionality for router 80. Router 80 also includes a plurality of packet-forwarding engines 114A-114N ("PFEs 114") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 120 may comprise a Gigabit Ethernet connection. Switch fabric 118 provides a high-speed interconnect for forwarding incoming data packets between PFEs 114 for transmission over a network.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of router 80 using text-based commands. Simple Network Management Protocol daemon 99 ("SNMP 99") comprises an SNMP agent that receives SNMP commands from a management entity, such as SDN controller 14 (FIG. 1), to set and retrieve configuration and management information for router 80. Using CLI 92 and SNMP 99, one or more management entities may enable/disable and configure services, install routes, enable/disable and configure rate limiters and configure interfaces, for example.

One or more routing protocols, such as IGP 94 or BGP 98, maintains routing information in the form of routing information base (RIB) 104 that describes a topology of a network, and derives a forwarding information base (FIB) 106 in accordance with the routing information. In general, the routing information represents the overall topology of the network. IGP 94 and BGP 98 can interact with kernel 101 (e.g., by way of API calls) to update RIB 104 based on routing protocol messages received by router 80. RIB 104 may include information defining a topology of a network, including one or more routing tables and/or link-state databases.

Typically, the routing information defines routes (i.e., series of next hops) through a network to destinations/prefixes within the network learned via a distance-vector routing protocol (e.g., BGP 98) or defines the network topology with interconnected links learned using a link state routing protocol (e.g., IS-IS or OSPF) of IGP 94. In contrast, FIB 106 is generated based on selection of certain routes within the network and maps packet key information (e.g., destination information and other select information from a packet header) to one or more specific next hops and ultimately to one or more specific output interface ports of IFCs 112.

Routing component 86 also provides an operating environment of one or more traffic engineering protocols to establish tunnels for forwarding subscriber packets through the ordered set of service nodes 10 associated with different service chains. For example, Resource Reservation Protocol with Traffic Engineering extensions (RSVP-TE) 96 may exchange traffic engineering information, such as MPLS labels for enabling label-based packet forwarding. As another example, routing component 86 may use GRE or IP-based tunneling protocols (not shown) to establish traffic engineered tunnels. Routing component 86 may maintain, for example, a traffic engineering database (TED) 109 to store the traffic engineering data. Protocols 89 can also include label distribution protocol (LDP) 100.

Routing component 86 provides an operating environment of TWAMP 110. According to the techniques described in this disclosure, TWAMP 110 may be extended to enable measurement of any of a plurality of service KPIs for a given service in the network, and to enable operation within a SDN and NFV based network architecture.

For example, in the case where router 80 operates within a SDN and NFV architecture, a TWAMP control client may be executed on a centralized controller, such as SDN controller 14 from FIG. 1, and a TWAMP session initiator may be executed on router 80. The extensions to TWAMP 110 enable control messaging to be handled by the TWAMP control client on SDN controller 14, and data messaging to be handled by the TWAMP session initiator on router 80. More specifically, the extensions to TWAMP 110 include an additional set of TWAMP control messages used by the TWAMP control client on SDN controller 14 to instruct the TWAMP session initiator on router 80 to measure service KPIs for one or more services over data sessions established with a TWAMP server.

According to the disclosed techniques, the TWAMP session initiator running on router 80 may be configured to receive the TWAMP control messages from the TWAMP control client, establish at least one data session for a given service with the TWAMP server, collect service data measurements for one or more selected service KPIs over the data session, and communicate the service data measurements to the TWAMP control client. In some cases, the TWAMP session initiator and the TWAMP server may both be executed on router 80. For example, the TWAMP session initiator and the TWAMP server may be running on different virtual machines of router 80. In other examples, the TWAMP server may be executed on another network device, either on a physical chassis of the network device or on a VM of the network device.

In addition, the extension to TWAMP 110 include extensions to TWAMP data messages used to transmit service data measurements for one or more selected service KPIs over a data session for a given service. The service KPIs to be measured may include one or more of keepalive measurements, round trip time measurements, path delay measurements, service latency measurements, or service load measurements. According to the disclosed techniques, a padding area within TWAMP test packets may be used to carry the service data measurements for the selected service KPIs for the given service between a session reflector associated with the TWAMP server and a session sender associated with either a TWAMP control client or the TWAMP session initiator on router 80. The extensions to TWAMP 110 for the service KPIs may be used in SDN and NFV architectures and in conventional network architectures in which the TWAMP control client and the TWAMP session initiator are executed on the same network device, e.g., router 80.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of border router 80. In some instances, routing component 86 may derive separate and different software FIBs for each respective PFEs 114. In addition, one or more of PFEs 114 include application-specific integrated circuits (ASICs 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 96 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of IFCs 112 associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic 56 automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of router 80. Operations may be performed, for example, on each packet based on any of a corresponding ingress interface, an ingress PFE 114, an egress PFE 114, an egress interface or other components of router 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the manner in which a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate subscriber packets in accordance with the forwarding information. In this way, ASICs 116 may process subscriber packets to select particular service paths for each packet and encapsulate the subscriber packets in accordance with the selected service paths. Routing component 86 may generate RIB 104 and FIB 106 to associate subscriber packet flows with particular service paths based on one or more service profiles associated with each subscriber, as may be received from an AAA server, a policy controller, a SDN controller or other network element.

The architecture of router 80 illustrated in FIG. 6 is shown for example purposes only. This disclosure is not limited to this architecture. In other examples, router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an ASIC, a FPGA, or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 7:
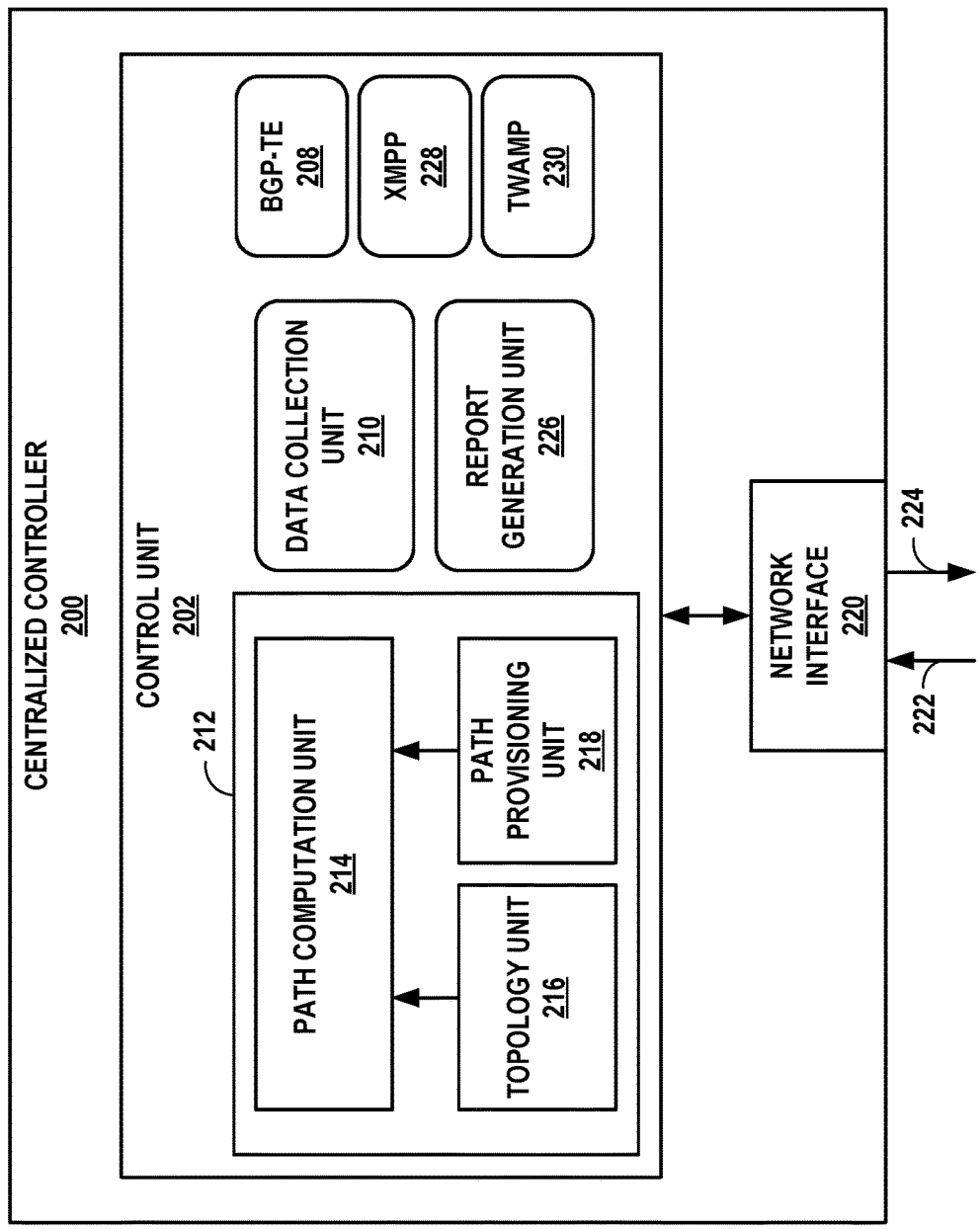
FIG. 7 is a block diagram illustrating an example centralized controller configured to execute a TWAMP control client, in accordance with the techniques of this disclosure.

FIG. 7 is a block diagram illustrating an example centralized controller device 200 configured to execute a TWAMP control client, in accordance with the techniques of this disclosure. Centralized controller device 200 may include aspects of one or more of a network controller, an AAA server, a policy controller, or a SDN controller, for example, and may represent an example instance of SDN controller 14 from FIG. 1.

Centralized controller device 200 includes a control unit 202 coupled to a network interface 220 to exchange packets with other network devices by inbound link 222 and outbound link 224. Control unit 202 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein. Alternatively or additionally, control unit 202 may comprise dedicated hardware, such as one or more integrated circuits, one or more ASICs, one or more Application Specific Special Processors (ASSPs), one or more FPGAs, or any combination of one or more of the foregoing examples of dedicated hardware, for performing the techniques described herein.

Control unit 202 provides an operating environment for data collection unit 210, path computation element 212, and report generation unit 226. As described in more detail below, data collection unit 210 may operate substantially similar to data collection unit 34 in SDN controller 14 from FIGS. 2-4. In one example, these units may be implemented as one or more processes executing on one or more virtual machines of one or more servers. That is, while generally illustrated and described as executing on a single centralized controller device 200, aspects of these units may be delegated to other computing devices. Control unit 202 also provides an operating environment for several protocols, including Border Gateway Protocol with Traffic Engineering extensions (BGP-TE) 208, Extensible Messaging and Presence Protocol (XMPP) 228, and TWAMP 230.

In some examples, centralized controller device 200 may compute and establish paths through the network, such as service provider network 2 from FIG. 1. As illustrated in FIG. 7, path computation element 212 includes a path computation unit 214, a topology unit 216 and a path provisioning unit 218. Topology unit 216 may receive and store topology information describing available resources of the network, including access, aggregation, and edge nodes, interfaces thereof, and interconnecting communication links. Topology unit 216 may receive the topology information from one or more network devices acting as BGP peers within the network. For example, control unit 202 executes BGP-TE 208 to form BGP peers with BGP speakers and BGP listeners within the network to exchange routing and topology information.

Path computation unit 214 of path computation element 212 may use the topology information received by topology unit 216 to compute requested paths through the network. Upon computing the paths, path computation unit 214 may schedule the paths for provisioning by path provisioning unit 218. A computed path includes path information usable by path provisioning unit 218 to establish the path in the network. Provisioning a path may require path validation prior to committing the path to provide for packet transport.

In some examples, control unit 202 uses a protocol such as XMPP 228 to communicate with physical network devices, such as router 8, router 18, or service nodes 10 from FIG. 1, by an XMPP interface (not shown). Virtual network route data, statistics collection, logs, and configuration information may be sent as extensible markup language (XML) documents in accordance with XMPP 228 for communication between centralized controller device 200 and the network devices.

According to the techniques described in this disclosure, TWAMP 230 may be extended to enable selecting and monitoring any of a plurality of service KPIs for a given service in the network, and to enable operation within a SDN and NFV based network architecture.

For example, in the SDN and NFV architecture, a TWAMP control client may be executed on centralized controller device 200 and a TWAMP session initiator may be executed on a network device, such as router 8 or router 8 from FIG. 1 or router 80 from FIG. 6. The extensions to TWAMP 230 enable control messaging to be handled by the TWAMP control client on centralized controller device 200, and data messaging to be handled by the TWAMP session initiator on the network device. More specifically, the extensions to TWAMP 230 include an additional set of TWAMP control messages used by the TWAMP control client on centralized controller device 200 to instruct the TWAMP session initiator on the network device to measure service KPIs for one or more services over data sessions established with a TWAMP server, and communicate service data measurements for the service KPIs to the TWAMP control client on centralized controller device 200.

In addition, the extension to TWAMP 230 include extensions to TWAMP control messages used to select one or more of the service KPIs to be measured for a given service. The service KPIs to be measured may include one or more of keepalive measurements, round trip time measurements, path delay measurements, service latency measurements, or service load measurements. According to the disclosed techniques, the TWAMP control client running on centralized controller device 200 may be configured to negotiate one or more data sessions for one or more services with the TWAMP server, including negotiating modes of the data sessions, supported services, supported service KPIs for each of the services, and selected service KPIs from among the supported service KPIs to be measured over the data sessions.

Data collection unit 210 within control unit 202 may receive data, including service data measurement for selected service KPIs associated with a data session for a given service, from the TWAMP session initiator on the network device via the additional TWAMP control messages. Data collection unit 210 may, in turn, communicate the service data measurements and/or calculated service KPIs to an NFV orchestrator, e.g., NFV-O 13 from FIGS. 1-4. In some examples, the service data measurements and/or calculated service KPIs may be used by centralized controller device 200 for traffic engineering and optimization of services traffic in terms of latency and load balancing. Data collection module 210 or a separate analytics engine (not shown) within centralized controller device 200 may calculate, compile, and analyze the service KPIs based on the received service data measurements. In some examples, data collection module 210 or the analytics engine may identify the service KPIs as being from the same packet flow, and hence to be analyzed together, based on various aspects, such as device identifier information, timestamp information, and other information. Report generation unit 226 may aggregate the reporting information and generate a report for customers or an administrator.

Figure 8:
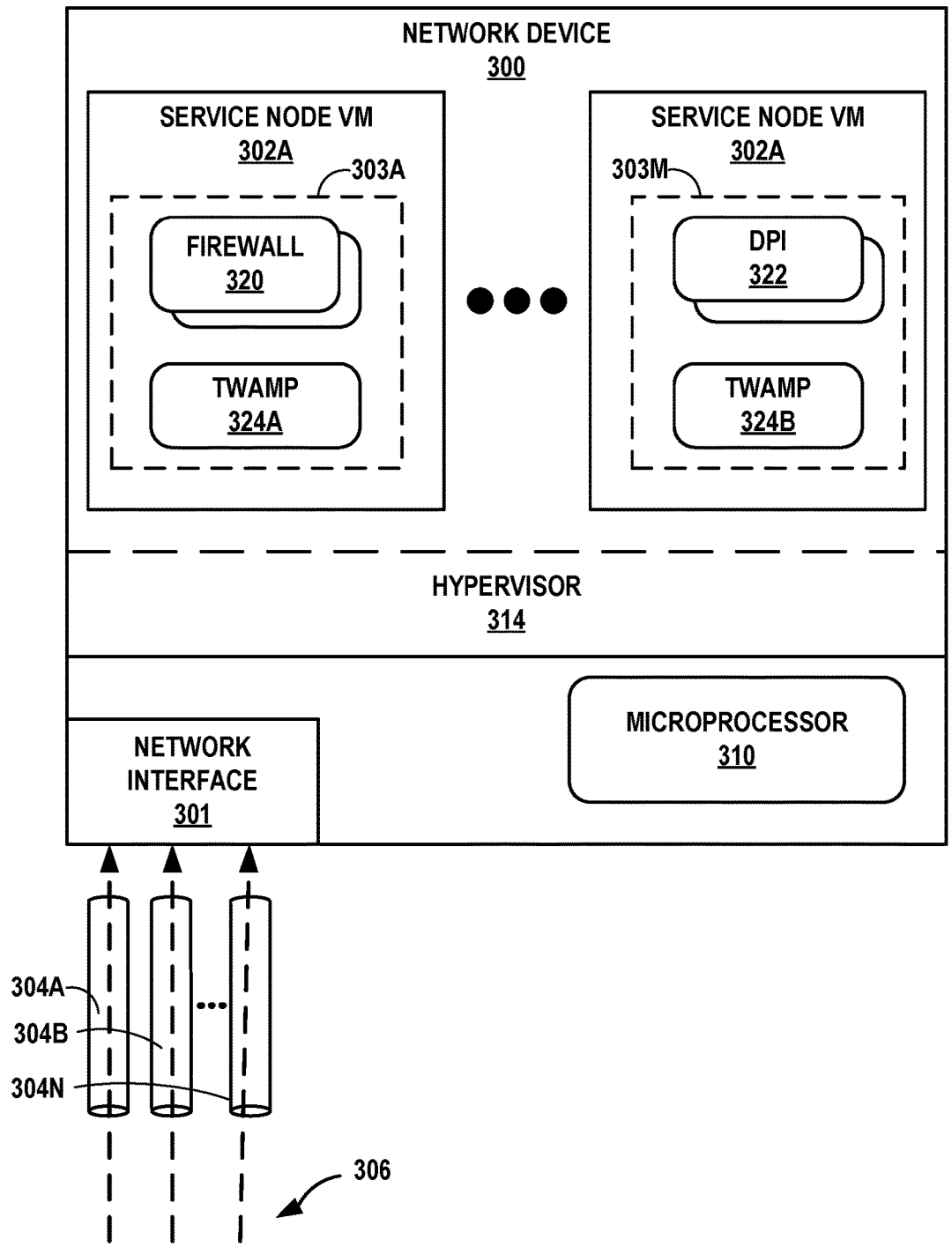
FIG. 8 is a block diagram illustrating an example network device configured to execute a TWAMP server, in accordance with the techniques of this disclosure.

FIG. 8 is a block diagram illustrating an example network device 300 configured to execute a TWAMP server, in accordance with the techniques of this disclosure. For purposes of illustration, network device 300 may be described herein within the context of service provider network 2 of FIG. 1, and may represent any of router 8, router 18, service nodes 10, or data center 9, for example. In other examples, network device 300 may comprise any network device, such as a router, a switch or a server, within service provider network 2.

In the example of FIG. 8, network device 300 includes a microprocessor 310 executing hypervisor 314 to provide an execution environment for one or more service node virtual machines (VMs) 302A-302M (collectively "service node VMs 302"). Each of service node VMs 302 executes network services applications 303A-303M (collectively "network service applications 303"), such as stateful firewall 320 and deep packet inspection (DPI) 322, to apply stateful network services to packet flows. In addition, each of service node VMs 302 executes TWAMP 324A-324B (collectively "TWAMP 324") to process received TWAMP control messages and report service data measurements for one or more service KPIs.

In the example illustrated in FIG. 8, network device 300 includes a network interface 301 to receive tunnel packets 306 over a plurality of tunnels 304A-304N ("tunnels 304"). Each of the tunnels 304 corresponds to different one of a plurality of service chains, where each of the service chains comprises a different ordered set of one or more stateful network services to be applied to packet flows associated with subscribers. Each of the tunnel packets 306 encapsulates a subscriber packet. In some cases, the subscriber packet may be a TWAMP test packet injected by a session sender associated with either a TWAMP control client or a TWAMP session initiator.

According to the techniques described in this disclosure, TWAMP 324 may be extended to enable selecting and monitoring any of a plurality of service KPIs for a given service in the network, and to enable operation within a SDN and NFV based network architecture. In the example of FIG. 8, a TWAMP server may be executed on either a physical chassis of network device 300 or on one or more of service node VMs 302 of network device 300.

The extension to TWAMP 324 includes extensions to TWAMP control messages used to select one or more of the service KPIs to be measured for a given service, and extensions to TWAMP data messages used to transmit service data measurements for the selected service KPIs over a data session for the given service. The service KPIs to be measured may include one or more of keepalive measurements, round trip time measurements, path delay measurements, service latency measurements, or service load measurements.

For example, in the case where network device 300 operates within a SDN and NFV architecture, a TWAMP control client may be executed on a centralized controller, such as SDN controller 14 from FIG. 1 or centralized controller device 200 from FIG. 7, and a TWAMP session initiator may be executed on a network device, such as router 8 or router 18 from FIG. 1, router 80 from FIG. 6, or even network device 300. The extensions to TWAMP 324 enable control messaging with the TWAMP server on network device 300 to be handled by the TWAMP control client on the centralized controller, and data messaging with the TWAMP server on network device 300 to be handled by the TWAMP session initiator on the network device. According to the disclosed techniques, the TWAMP control client running on the centralized controller may be configured to negotiate one or more data sessions for one or more services with the TWAMP server running on network device 300, including negotiating modes of the data sessions, supported services, supported service KPIs for each of the services, and selected service KPIs from among the supported service KPIs to be measured over the data sessions.

In further accordance with the disclosed techniques, the TWAMP server running on network device 300 may be configured to use a padding area within TWAMP test packets to carry the service data measurements for the selected service KPIs for the given service between a session reflector associated with the TWAMP server on network device 300 and a session sender associated with either the TWAMP control client or the TWAMP session initiator. The extensions to TWAMP 230 for the service KPIs may be used in SDN and NFV architectures and in conventional network architectures in which the TWAMP control client and the TWAMP session initiator are executed on the same network device.

FIGS. 9, 10, 11A-11C, and 12 are conceptual diagrams illustrating example formats of TWAMP control messages between a TWAMP control client and a TWAMP server, in accordance with the techniques of this disclosure. The set of control messages (sometimes referred to a service block) may be exchanged between the TWAMP control client and the TWAMP server to negotiate one or more data sessions for one or more services, and monitor the service KPIs to be measured for each of the services.

FIG. 9 illustrates an example format of a server greeting message sent by the TWAMP server to the TWAMP control client in response to a control connection initiated by the TWAMP control client. The TWAMP control client may initiate the control connection with the TWAMP server using, e.g., TCP. The server greeting message illustrated in FIG. 9 includes several fields, including a modes field, a challenge field, a salt field, a count field, and a must be zero (MBZ) field, and in some cases an associated number of octets for each field. The octet numbers included in the server greeting message are merely examples. In other examples, the number of octets for each of the fields may be different than those included in FIG. 9.

The modes field included in the server greeting message may be used to indicate which modes are supported by the TWAMP server. For example, the modes field may be used to identify and select specific communication capabilities. In accordance with the disclosed techniques, at least one bit position within the modes field of the server greeting message may be used to indicate whether the TWAMP server or a session reflector associated with the TWAMP server supports monitoring of service KPIs.

In one example, a $27^{th}$ bit in the modes field of the servicer greeting message illustrated in FIG. 9 may be used to indicate whether the TWAMP server supports monitoring of service KPIs. Conventionally, the modes field may have any of the following values: 1: unauthenticated, 3: unauthenticated+authenticated, or 7: unauthenticated+authenticated+encrypted. With TWAMP extensions to measure service latency as one of the service KPIs, the modes field may have any of the following values: 0x09: unauthenticated+supports active service latency measurements, 0x0b: unauthenticated+authenticated+supports active service latency measurements, or 0x0F: unauthenticated+authenticated+encrypted+supports active service latency measurements.

With TWAMP extensions to measure service latency and/or service loads as the service KPIs, the modes field may have any of the following values: 0x19: unauthenticated+supports active service latency measurements+supports service traffic load measurements, 0x1b: unauthenticated+authenticated+supports active service latency measurements+supports service traffic load measurements, or 0x1F: unauthenticated+authenticated+encrypted+supports active service latency measurements+supports service traffic load measurements. If the modes field has a value of 0, it may means that the TWAMP server is not interested in communicating. In that case, the TWAMP control client may close the control connection. This is a conventional behavior that may continue to exist with the disclosed TWAMP extensions.

In a set up response message sent by the TWAMP control client to the TWAMP server in response to server greeting message, the TWAMP control client may select any of the modes indicated in the server greeting message, and reply back to the TWAMP server with the selected mode. For example, if the TWAMP control client wants to receive service traffic load measurements, a modes field included in the set up response message may have any of the following values: 1: unauthenticated, 3: unauthenticated+authenticated, or 7:unauthenticated+authenticated+encrypted.

Upon establishment of the control connection between the TWAMP control client and the TWAMP server, the TWAMP control client may request monitoring of service KPIs for one or more data sessions for one or more services with the TWAMP server. To do so, the TWAMP control client may need to which services are supported at the TWAMP server and which service KPIs are supported for those services. Described in more detail below, a service KPIs monitoring command (SKMC) includes a set of messages to be used for monitoring one or more selected service KPIs associated with the data sessions for the supported services.

FIG. 10 illustrates an example format of a service monitoring request message (sometimes referred to as a request service supported message or a services KPI monitor request message) sent by the TWAMP control client to the TWAMP server in response to a server start message sent by the TWAMP server to the TWAMP control client.

The server start message received at the TWAMP control client may include an accept field indicating whether the control connection is accepted by the TWAMP server. In some examples, the accept field may have a value of 0-5, with 0 meaning the connection is okay and a non-zero value meaning the control connection will be closed. For example, the accept field may have the following values: 0: okay, 1: failure, reason unspecified (catch-all), 2: internal error, 3: some aspect of request is not supported, 4: cannot perform request due to permanent resource limitations, or 5: cannot perform request due to temporary resource limitations. In addition, the server start message may include a start time field that includes a start time if the accept field has a value equal to 0.

When the control connection is accepted by the TWAMP server, the TWAMP control client sends the service monitoring request message requesting which services are supported at the TWAMP server. The TWAMP client may send the service monitoring request message to the TWAMP server in order to receive a list of supported services and their supported service KPIs that can be monitored by a session reflector associated with the TWAMP server.

As illustrated in FIG. 10, the service monitoring request message includes several fields, including a command number field having a SKMC value, a sub-type field having a value "request," a MBZ field, and a hash-based message authentication code (HMAC) field, and in some cases an associated number of octets for each field. The octet numbers included in the service monitoring request message are merely examples. In other examples, the number of octets for each of the fields may be different than those included in FIG. 10. The command number value of the SKMC indicates that this is one of the SKMC messages. In one example, the SKMC value is equal to 7 for the service monitoring request message. The sub-type field value of "request" indicates that the TWAMP control client is requesting the TWAMP server to send the list of services and their service KPIs that can be monitored.

FIGS. 11A-11C illustrates an example format of a service monitoring response message set (sometimes referred to as a response service supported message) sent between the TWAMP control client to the TWAMP server in response to a service monitoring request message (FIG. 10) sent by the TWAMP control client to the TWAMP server. As illustrated, the service monitoring response message set includes a first service monitoring response message (sometimes referred to as a services KPI monitor response message) illustrated in FIG. 11A, a second service monitoring response message (sometimes referred to as a services KPI monitor indication message) illustrated in FIG. 11B, and a service monitoring acknowledgment (ACK) message (sometimes referred to as a services KPI monitor acknowledgment message) illustrated in FIG. 11C.

Upon receiving the service monitoring request message (FIG. 10), the TWAMP server sends the first service monitoring response message (FIG. 11A) including the number of supported services at the TWAMP server. Following this message, the TWAMP server or the session reflector associated with the TWAMP server sends the second service monitoring response message (FIG. 11B) including a service ID used to identify each of the supported service and a list of service KPIs that are supported for each service ID. In some cases, this message may be set for each of the supported services. The TWAMP control client then replies back with the service monitoring ACK message (FIG. 11C) that include a list of selected service KPIs from among the list of supported service KPIs for each service ID that the TWAMP control client is interested in monitoring. In some cases, this message may be set for each of the supported services.

In some examples, the service KPIs may include one or more of keepalive measurements, round trip time measurements, path delay measurements, service latency measurements, or service load measurements. The keepalive measurements may indicate whether or not a respective service is running. The service latency measurement may include transit time and actual service time. The service load measurements may be based on one of a count of serviced packets (i.e., a number of ingress and egress packets for the respective service), a count of serviced bytes (i.e., a number of ingress and egress bytes for the respective service), or a count of serviced subscribers (i.e., a number of subscribers for the respective service).

As illustrated in FIG. 11A, the first service monitoring response message includes several fields, including a command number field having a SKMC value, a sub-type field having a value "response," a MBZ field, a number of services supported field, and a HMAC field, and in some cases an associated number of octets for each field. The octet numbers included in the first service monitoring response message are merely examples. In other examples, the number of octets for each of the fields may be different than those included in FIG. 11A. The command number value of the SKMC indicates that this is one of the SKMC messages. In one example, the SKMC value is equal to 8 for the service monitoring response message. The sub-type field value of "response" indicates that the TWAMP server is responding to the TWAMP control client. The number of services supported field indicates the number of services for which the session reflector associated with the TWAMP server can monitor service KPIs.

As illustrated in FIG. 11B, the second service monitoring response message includes several fields, including a command number field having a SKMC value, a sub-type field having a value "indication," a service ID field, a service identification string field, a supported bitmask of service KPIs for service field, and a HMAC field, and in some cases an associated number of octets for each field. The octet numbers included in the second service monitoring response message are merely examples. In other examples, the number of octets for each of the fields may be different than those included in FIG. 11B. The command number value of the SKMC indicates that this is one of the SKMC messages. The sub-type field value of "indication" indicates that the TWAMP server is responding to the TWAMP control client with details of what service KPIs can be monitored for a given service by the session reflector associated with the TWAMP server.

The service ID field may be a proprietary number set by the TWAMP server to identify a given service supported at the TWAMP server. The service identification string field may be alphanumeric characters that briefly indicate the purpose of the given service identified by the service ID. The supported bitmask of service KPIs for service field is a bitmask that indicates what types of service KPIs are supported for the given service by the session reflector associated with the TWAMP server. The TWAMP server may send a second service monitoring response message illustrated in FIG. 11B to the TWAMP control client for each of the supported service KPIs for the given service.

As illustrated in FIG. 11C, the service monitoring ACK message includes several fields, including a command number field having a SKMC value, a sub-type field having a value "ACK," a service ID field, a service identification string field, a requested bitmask of service KPIs for service field, and a HMAC field, and in some cases an associated number of octets for each field. The octet numbers included in the service monitoring ACK message are merely examples. In other examples, the number of octets for each of the fields may be different than those included in FIG. 11C. The command number value of the SKMC indicates that this is one of the SKMC messages. The sub-type field value of "ACK" indicates that the TWAMP control client is acknowledging the TWAMP server with details of which service KPIs for a given service the TWAMP control client is interested in monitoring.

The service ID field and the service identification string field have the same values as what was received in the second service monitoring response message (FIG. 11B) in order to identify the given service. The requested bitmask of service KPIs for service field is set by the TWAMP control client based on what service KPIs of the given service, from among the supported service KPIs indicated in the second service monitoring response message (FIG. 11B), the TWAMP control client is interested in monitoring. The TWAMP server receives a service monitoring ACK message illustrated in FIG. 11C for each and every second service monitoring response message (FIG. 11B) sent. The TWAMP server may close the control connection if it does not receive a service monitoring ACK message (FIG. 11C).

FIG. 12 illustrates an example format of a request session message sent by the TWAMP control client to the TWAMP server to request a data session for a given service supported at the TWAMP server. As illustrated in FIG. 12, the request session message includes several fields, including, among others, a session ID (SID) field and a service ID field, and in some cases an associated number of octets for each field. The octet numbers included in the request session message are merely examples. In other examples, the number of octets for each of the fields may be different than those included in FIG. 12.

The request session message sent by the TWAMP control client requesting the data session for the given service includes the service ID field to identify the given service to the TWAMP server. This service ID field may comprise two octets. If monitoring of service KPIs is not requested as a part of the requested data session, then the service ID field has a value of 0. If the service ID field has a non-zero value, then the padding length field will not have any significance because the TWAMP test packets will be of different sizes depending on which types of service KPIs are being monitored over the data session.

If the sender address field or the receiver address field has a zero value, the requested data sessions will be on the TWAMP control client's source address and destination address. If the receiver port field has a zero value, it means that the TWAMP control client does not have any preferred port on the TWAMP server for requested data sessions. The timeout field indicates the interval that the session reflector associated with the TWAMP server needs to wait after receiving a stop sessions message from the TWAMP control client. The SID field in the request session message illustrated in FIG. 12 always has a value of 0 because the TWAMP server has not yet assigned a SID to the requested data session.

In response to the request session message (FIG. 12), the TWAMP server may reply back with an accept session message accepting the data session for the given service, and including a non-zero SID used to identify the accepted data session. The SID value may be generated by the TWAMP server for the accepted data session. In some examples, the accept session message may include an accept field having a value of 0-5, with 0 meaning success and a non-zero value meaning the control connection will be closed, and a port field indicating a port number at the TWAMP server for the accepted data session. The TWAMP control client may then send a start sessions message to the TWAMP server, and the TWAMP server may reply with a start ACK message including an accept field having a value of 0-5, with 0 meaning success and the control connection being closed if the accept field has a non-zero value.

In the example of a conventional network architecture in which the TWAMP control client and the TWAMP session initiator are executed on the same network device, upon receiving the accept session message, either the TWAMP control client or the TWAMP session initiator may start sending TWAMP test packets to the TWAMP server to measure selected service KPIs associated with the data session for the given service. In the example of a SDN and NFV network architecture in which the TWAMP control client is executed on a centralized controller and the TWAMP session initiator is executed on a different network device, upon receiving the accept session message, the TWAMP control client may use a new set of control messages to instruct the TWAMP session initiator to establish the negotiated data session and start sending TWAMP test packets to the TWAMP server to measure selected service KPIs associated with the data session for the given service.

At some point, the TWAMP control client may send a stop session message to the TWAMP server including an accept field having a value of 0 meaning normal but possibly premature completion of the data session, or having a nonzero value indicating some failure. As a result of the stop sessions message, the control connection between the TWAMP control client and the TWAMP server will be closed and all data sessions spawned over the control connection will be considered invalid. The stop session message may also include a number of sessions field. If the number of sessions field in the stop session message does not match the number of data sessions in progress, then the stop session message may be considered invalid.

FIGS. 13A-13B and 14A-14B are conceptual diagrams illustrating example formats of TWAMP test packets between either a TWAMP control client or a TWAMP session initiator and a TWAMP server, in accordance with the techniques of this disclosure. The TWAMP test packets may be exchanged to request and communicate service data measurements for one or more selected service KPIs associated with an established data session for a given service. The selected service KPIs may be determined during negotiation of the data session between the TWAMP control client and the TWAMP server, as described above with respect to FIGS. 9, 10, 11A-11C, and 12. The techniques described in this disclosure include extensions to the TWAMP test packets. Conventionally, a TWAMP test packet has padding octets that are not used (e.g., either set to zero or random values). According to the disclosed techniques, these padding octets may be used to carry service data measurements for one or more service KPIs for a given service. For example, the padding octets may have some valid data such as timestamps, statistics, service PDUs, or the like.

Figure 13A:
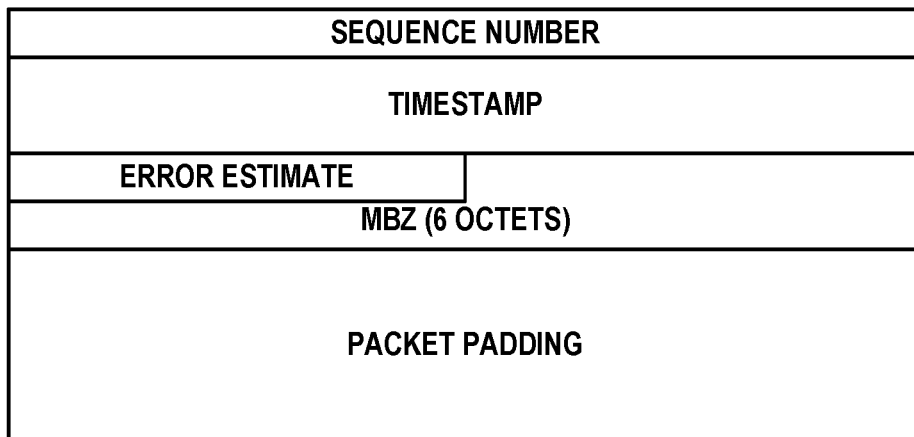

FIG. 13A illustrates an example format of a TWAMP test packet for the unauthenticated mode sent by a session sender associated with either the TWAMP control client or the TWAMP session initiator to a session reflector associated with the TWAMP server over an established data session. In some cases, this test packet may be referred to as a session sender request message or a session sender test packet.

As illustrated in FIG. 13A, the session sender test packet includes several fields, including a sequence number field, a timestamp field, an error estimate field, and packet padding, and in some cases an associated number of octets for each field. The octet numbers included in the session sender test packet are merely examples. In other examples, the number of octets for each of the fields may be different than those included in FIG. 13A. As part of the disclosed TWAMP extensions, the session sender test packet may include 6 octets of an MBZ field after the error estimate field, as illustrated in FIG. 13A.

Figure 13B:
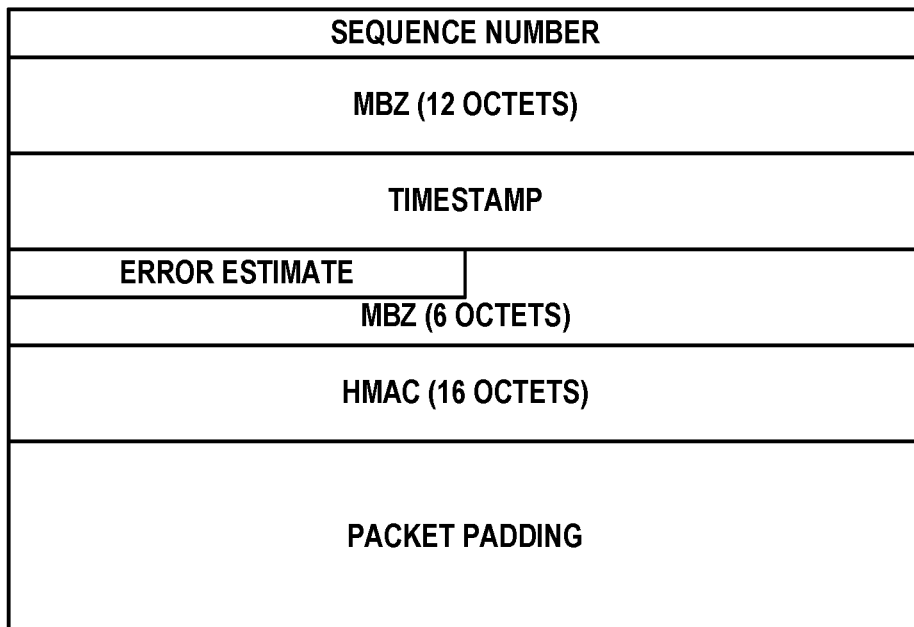

FIG. 13B illustrates an example format of a TWAMP test packet for the authenticated and encrypted modes sent by the session sender associated with either the TWAMP control client or the TWAMP session initiator to the session reflector associated with the TWAMP server over an established data session. In some cases, this test packet may be referred to as a session sender request message or a session sender test packet.

As illustrated in FIG. 13B, the session sender test packet includes several fields, including a sequence number field, a timestamp field, an error estimate field, a HMAC field, and packet padding, and in some cases an associated number of octets for each field. The octet numbers included in the session sender test packet are merely examples. In other examples, the number of octets for each of the fields may be different than those included in FIG. 13B. As part of the disclosed TWAMP extensions, the session sender test packet may include 6 octets of an MBZ field after the error estimate field, as illustrated in FIG. 13B.

FIG. 14A illustrates an example format of a TWAMP test packet for the unauthenticated mode sent by the session reflector associated with the TWAMP server to the session sender associated with either the TWAMP control client or the TWAMP session initiator over an established data session. In some cases, this test packet may be referred to as a session reflector reply message or a session reflector test packet.

As illustrated in FIG. 14A, the session reflector test packet includes several fields, including a sequence number field, a timestamp field, an error estimate field, a receive timestamp field, a sender sequence number field, a sender timestamp field, a send error estimate field, a sender time to live (TTL) field, a bitmask of service KPIs monitored for service field, and packet padding, and in some cases an associated number of octets for each field. The octet numbers included in the session reflector test packet are merely examples. In other examples, the number of octets for each of the fields may be different than those included in FIG. 14A. As part of the disclosed TWAMP extensions, the session reflector test packet may include 3 octets of an MBZ field after the error estimate field in order to align the next set of fields in the packet format.

The bitmask of service KPIs monitored for service field may include a list of the selected service KPIs for the given service that are included in the session reflector test packet. More specifically, the bitmask may include bits that are set to indicate which of the service KPIs are carried in this message. According to the example illustrated in FIG. 14A, the service data measurements for the indicated service KPIs may be present in the packet padding area in the same order as the indicator bits included in the bitmask starting from 0. In some examples, the service data measurements may be carried in service protocol data units (PDUs) or service data units (SDUs) within the packet padding area. In other examples, the service data measurements for the indicated service KPIs may be included as part of the header of the session reflector test packet, e.g., having separate fields for each of the service data measurements for the indicated service KPIs.

Figure 14B:
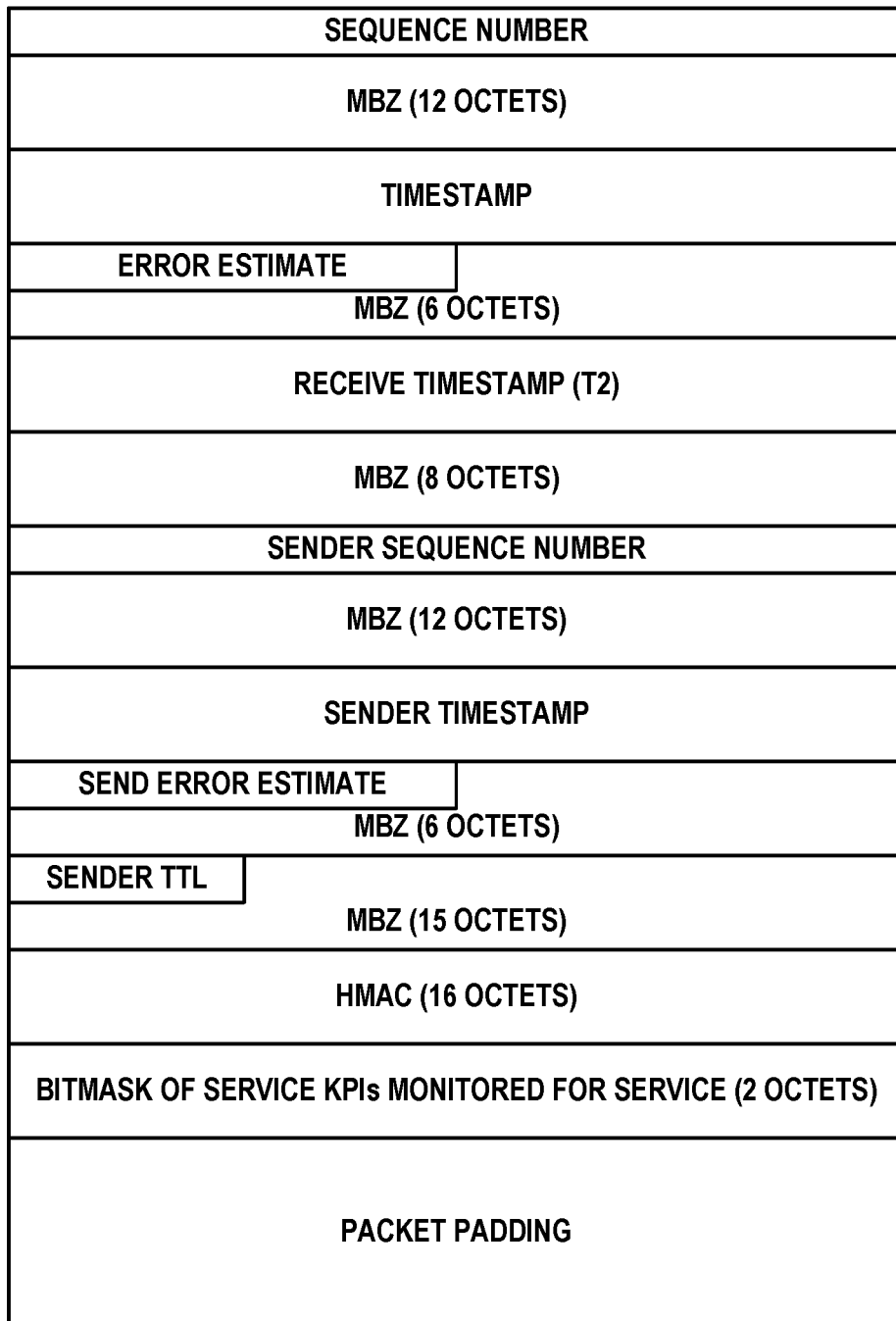

FIG. 14B illustrates an example format of a TWAMP test packet for the authenticated and encrypted modes sent by the session reflector associated with the TWAMP server to the session sender associated with either the TWAMP control client or the TWAMP session initiator over an established data session. In some cases, this test packet may be referred to as a session reflector reply message or a session reflector test packet.

As illustrated in FIG. 14B, the session reflector test packet includes several fields, including a sequence number field, a timestamp field, an error estimate field, a receive timestamp field, a send sequence number field, a sender timestamp field, a send error estimate field, a sender time to live (TTL) field, a HMAC field, a bitmask of service KPIs monitored for service field, and packet padding that may include one or more service PDUs, and in some cases an associated number of octets for each field. The octet numbers included in the session reflector test packet are merely examples. In other examples, the number of octets for each of the fields may be different than those included in FIG. 14B.

The bitmask of service KPIs monitored for service field may include a list of the selected service KPIs for the given service that are included in the session reflector test packet. More specifically, the bitmask may include bits that are set to indicate which of the service KPIs are carried in this message. According to the example illustrated in FIG. 14B, the service data measurements for the indicated service KPIs may be present in the packet padding area in the same order as the indicator bits included in the bitmask starting from 0. In some examples, the service data measurements may be carried in service PDUs or SDUs within the packet padding area. In other examples, the service data measurements for the indicated service KPIs may be included as part of the header of the session reflector test packet, e.g., having separate fields for each of the service data measurements for the indicated service KPIs.

With respect to the session reflector test packets illustrated in both FIGS. 14A and 14B, the indicated service KPIs in the bitmask may include one or more of keepalive measurements, round trip time measurements, path delay measurements, service latency measurements, or service load measurements. Several of the service KPIs and their associated service data measurements are described in more detail below.

The keepalive measurements may indicate whether or not a respective service is running. For services keepalive monitoring, the session sender associated with either the TWAMP control client or the TWAMP session initiator may send an SDU in the packet padding area of the session sender test packet. When the session reflector associated with the TWAMP server receives the session sender test packet, it extracts the SDU from the session sender test packet and injects the SDU into a service block for service processing by the given service. Based on whether or not the session reflector receives the packet back, the session reflect may determine whether or not the given service is running.

The session reflector starts the packet padding area of the session reflector test packet with bit X and bit Y, followed by an SDU, which may be the same as the SDU sent by the session sender or can be a reply or response packet received from the service block. Setting bit X indicates that the session reflector successfully sent a service request to service block and received a service response back. If bit X is not set, then it indicates that the service block is not functional. Setting bit Y indicates that the following SDU is the response packet that the session reflector received from the service block. If bit Y is not set, then it indicates that the following SDU is same as what was received from the session sender. It should be noted that even when the Y bit is set, there is a possibility that the following SDU in the session reflector test packet is similar to the SDU received in the session sender test packet. For example, this may occur when the service block is not changing any contents of the SDU on which it is acting.

The service latency measurement may include transit time and actual service time. For service latency monitoring, the session sender associated with either the TWAMP control client or the TWAMP session initiator may send an SDU in the packet padding area of the session sender test packet. When the session reflector associated with the TWAMP server receives the session sender test packet, it extracts the SDU. If an SDU is not present in the session sender test packet, the session reflector generates an SDU itself. The session reflector makes note of the time as the service latency measurement sender timestamp, and injects the SDU into a service block for service processing by the given service. Once the session reflector receives the packet back, the session reflector again makes note of the time as the service latency measurement receiver timestamp. If the session reflector does not receive the SDU within some predetermine time limit, then it may indicate the service latency measurement receiver timestamp as being equal to 0.

The session reflector starts the packet padding area of the session reflector test packet with the service latency measurement sender timestamp and the service latency measurement receiver timestamp. The timestamps are followed in the packet padding area by an SDU, which may be the same as the SDU sent by the session sender or can be a reply or response packet received from the service block.

The service load measurements may be based on one of a count of serviced packets (i.e., a number of ingress and egress packets for the respective service), a count of serviced bytes (i.e., a number of ingress and egress bytes for the respective service), or a count of serviced subscribers (i.e., a number of subscribers for the respective service).

For service load monitoring based on a serviced packets count, when the session reflector receives the session sender test packet, it retrieves information about a number of ingress service data packets and a number of egress service data packets from the service block. The session reflector starts the packet padding area of the session reflector test packet with the number of ingress service data packets and the number of egress service data packets, followed by actual packet padding.

For service load monitoring based on a serviced bytes count, when the session reflector receives the session sender test packet, it retrieves information about a number of ingress service data bytes and a number of egress service data bytes from the service block. The session reflector starts the packet padding area of the session reflector test packet with the number of ingress service data bytes and the number of egress service data bytes, followed by actual packet padding.

For service load monitoring based on a serviced subscribers count, when the session reflector receives the session sender test packet, it retrieves information about a total number of subscribers, a number of active subscribers, a number of non-active subscribers, a number of subscribers added, and a number of subscribers deleted. The total number of subscribers is the total number of subscribers that are currently present for the given service plus 1. This count includes active, non-active and any other type of subscribers. The number of active subscribers is the number of subscribers that are currently actively using the given service plus 1. The meaning of "active" may vary from service to service and may be implementation specific. The number of non-active subscribers is the number of subscribers that are currently not actively using the given service plus 1. The meaning of "not active" may vary from service to service and may be implementation specific. The number of subscribers added is the number of subscribers that were newly added compared to the last time the statistic was taken plus 1. The number of subscribers deleted is the number of subscribers that were deleted or preempted compared to the last time the statistics was taken plus 1.

Any of the above fields can be equal to 0 if that statistic is not supported or is not valid for a particular service. The session reflector should fill the value by increasing the actual service statistics by 1. For example, if the number of active subscribers is equal to 0, then the session reflector should fill this field with a value of 1. When the session sender receives this value, it should subtract 1 from the received value prior to using the value. The session reflector starts the packet padding area of the session reflector test packet with the total number of subscribers, the number of active subscribers, the number of non-active subscribers, the number of subscribers added, and the number of subscribers deleted, followed by actual packet padding.

FIGS. 15-18 are conceptual diagrams illustrating example formats of TWAMP control messages between a TWAMP control client and a TWAMP session initiator, in accordance with the techniques of this disclosure. The TWAMP extensions described in this disclosure include a new set of control messages exchanged between the TWAMP control client and the TWAMP session initiator to instruct the TWAMP session initiator to establish one or more data session for one or more services with a TWAMP server and collect service data measurements for service KPIs over the data sessions for the one or more services. The new set of control messages may be used in a SDN and NFV architecture in which the TWAMP control client is executed on a centralized controller and the TWAMP session initiator is executed on a separate network device, as illustrated in FIGS. 1-4.

Figure 15:
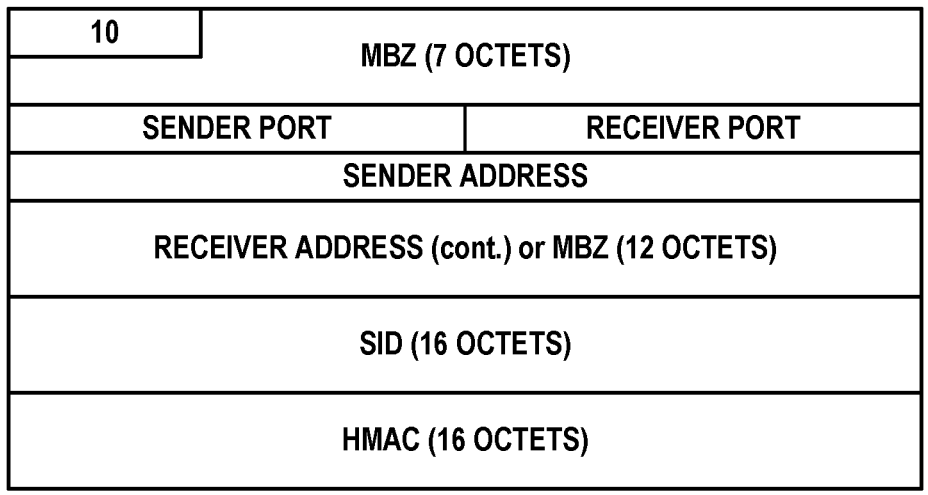

FIG. 15 illustrates an example format of a data session message (sometimes referred to as an initiate data session message) sent by the TWAMP control client to the TWAMP session initiator instructing the TWAMP session initiator to establish a data session for a given service with the TWAMP server. As illustrated in FIG. 15, the data session message includes several fields, including a message identifier field having a value of 10, a sender port field, a receiver port field, a sender address field, a receiver address field, a session identifier (SID) field, and a HMAC field, and in some cases an associated number of octets for each field. The octet numbers included in the data session message are merely examples. In other examples, the number of octets for each of the fields may be different than those included in FIG. 15.

The message identifier value of 10 indicates that this message is of type "initiate data session." The sender port field indicates the user datagram protocol (UDP) port number of the TWAMP session initiator, and the sender address field indicates the IP address of the TWAMP session initiator. The receiver port field indicates the UDP port number of the TWAMP server, and the receiver address field indicates the IP address of the TWAMP server. The SID field indicates an ID generated by the TWAMP server that is used to identify the data session to be established. The SID for the data session may be learned by the TWAMP control client from the TWAMP server during negotiation of the data session, described above with respect to FIGS. 9, 10, 11A-11C, and 12.

In response to receiving the data session message illustrated in FIG. 15, the TWAMP session initiator sends an ACK message to the TWAMP control client. The ACK message received at the TWAMP control client may include an accept field indicating whether the data session was successfully established or initiated. In some examples, the accept field may have a value of 0-5, with 0 meaning success and a non-zero value meaning that the control connection with the TWAMP server will be closed. For example, if something not successful at the TWAMP session initiator, then it replies back with the accept field having a non-zero value so that the TWAMP control client can close the control connection with the TWAMP server. If everything is successful, the TWAMP session initiator would reply back with the accept field having a value of 0.

Figure 16:
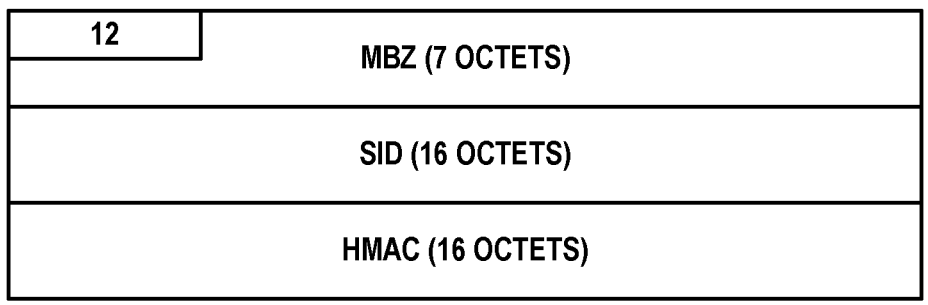

FIG. 16 illustrates an example format of a delete data session message sent by the TWAMP control client to the TWAMP session initiator instructing the TWAMP session initiator to delete a data session for a given service with the TWAMP server. Once the TWAMP session initiator receives this message, it would stop sending any more TWAMP test packets over the data session and close the data session with the TWAMP server.

As illustrated in FIG. 16, the delete data session message includes several fields, including a message identifier field having a value of 12, a SID field, and a HMAC field, and in some cases an associated number of octets for each field. The octet numbers included in the delete data session message are merely examples. In other examples, the number of octets for each of the fields may be different than those included in FIG. 16. The message identifier value of 12 indicates that this message is of type "delete data session." The SID field indicates an ID generated by the TWAMP server that is used to identify the data session to be deleted.

In response to receiving the delete data session message illustrated in FIG. 16, the TWAMP session initiator sends an ACK message to the TWAMP control client. The ACK message received at the TWAMP control client may include an accept field indicating whether the data session was successfully deleted. In some examples, the accept field may have a value of 0-5, with 0 meaning success and a non-zero value meaning that the control connection with the TWAMP server will be closed. For example, if something not successful at the TWAMP session initiator, then it replies back with the accept field having a non-zero value so that the TWAMP control client can close the control connection with the TWAMP server. If everything is successful, the TWAMP session initiator would reply back with the accept field having a value of 0.

FIG. 17 illustrates an example format of a request service data message sent by the TWAMP control client to the TWAMP session initiator requesting service data measurements for one or more selected service KPIs associated with the established data session for the given service from the TWAMP session initiator. The selected service KPIs for the given service may be determined by the TWAMP control client during negotiation of the data session, described above with respect to FIGS. 9, 10, 11A-11C, and 12. Once the TWAMP session initiator receives this message, it takes the latest collected service data measurements for the selected service KPIs and forms an ACK message to send back to the TWAMP control client, described in more detail below with respect to FIG. 18. In some examples, the request service data message may be optional. In those examples, the TWAMP session initiator may send the collected service data measurements for the service KPIs to the TWAMP control client periodically, and the request service data message may be used to trigger an immediate ACK message including the service data measurements.

As illustrated in FIG. 17, the request service data message includes several fields, including a message identifier field having a value of 11, a SID field, and a HMAC field, and in some cases an associated number of octets for each field. The octet numbers included in the request service data message are merely examples. In other examples, the number of octets for each of the fields may be different than those included in FIG. 17. The message identifier value of 11 indicates that this message is of type "request service data." The SID field indicates an ID generated by the TWAMP server that is used to identify the data session from which the service KPIs are to be collected.

FIG. 18 illustrates an example format of an ACK message sent by the TWAMP session initiator to the TWAMP control client in response to receiving the request service data message (FIG. 17). The ACK message includes the latest collected service data measurements for the selected service KPIs to be sent back to the TWAMP control client. The service data measurements included in the ACK message, e.g., RTT timestamps, service latency measurement timestamps, number of ingress and egress data packets, number of ingress and egress data bytes, and/or number of subscribers, may vary based on what types of service KPIs were selected to be monitored for the given service during negotiation of the data session, described above with respect to FIGS. 9, 10, 11A-11C, and 12.

As illustrated in FIG. 18, the request service data ACK message includes several fields, including an accept field, a size field, a SID field, a HMAC field, a send error estimate field, a receive error estimate field, and one or more service data measurement fields, and in some cases an associated number of octets for each field. The octet numbers included in the request service data ACK message are merely examples. In other examples, the number of octets for each of the fields may be different than those included in FIG. 18.

The accept field indicates whether the service data request was successful, with a value of 0 meaning success. The SID field indicates the same ID as was sent by the TWAMP control client in the request service data message (FIG. 17) to identify the data session from which the service KPIs are to be collected. The service data measurement fields included in the request service data ACK message illustrated in FIG. 18 are merely examples. In other examples, the ACK message could include any combination of service data measurements depending on the selected service KPIs to be measured for the given service.

Figure 19:
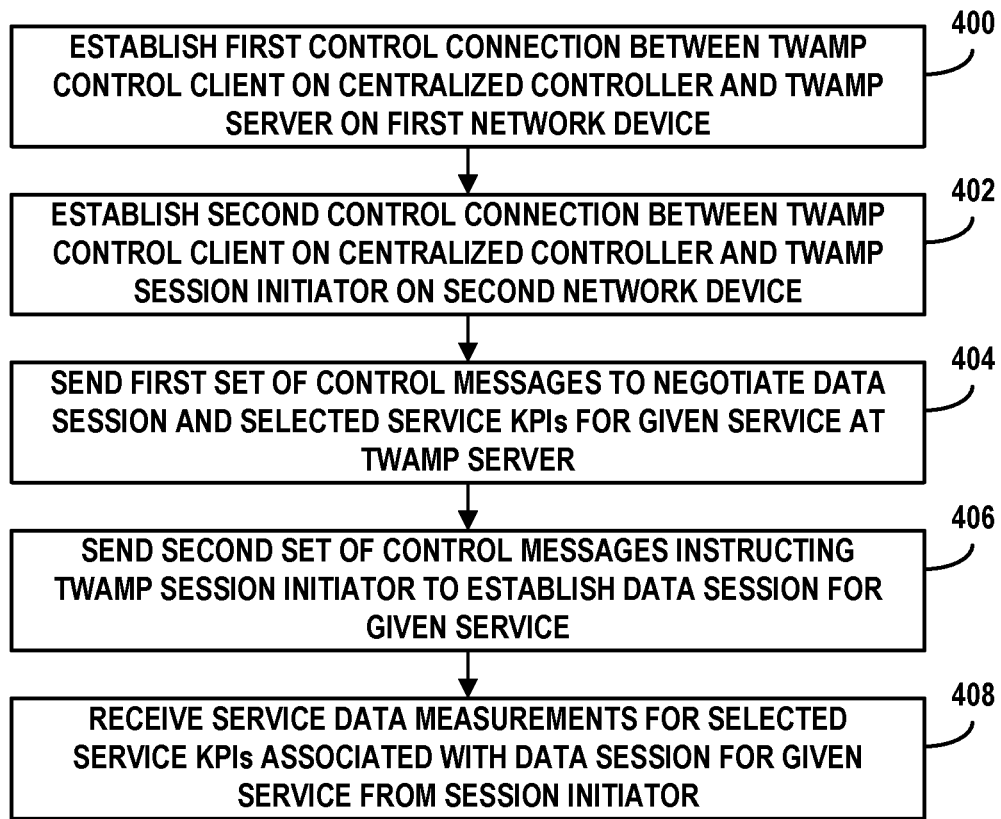
FIG. 19 is a flowchart illustrating an example operation of a TWAMP control client in a centralized controller of a network, in accordance with the techniques of this disclosure.

FIG. 19 is a flowchart illustrating an example operation of a TWAMP control client on a centralized controller of a network, in accordance with the techniques of this disclosure. The example operation of FIG. 19 will be described with respect to TWAMP control client 32 on SDN controller 14 from FIG. 2. In other examples, the operation illustrated in FIG. 19 may be performed by TWAMP control client 32 in any of the example use cases illustrated in FIGS. 3 and 4, or in other scenarios in which a TWAMP control client is executed on a centralized controller.

TWAMP control client 32 on SDN controller 14 establishes a first control connection with a TWAMP server 38A, for example, on first network device 30A in the network (400). When establishing the first control connection, TWAMP control client 32 may receive a TWAMP greeting message identifying a mode supported at TWAMP server 38A that indicates whether TWAMP server 38A supports monitoring of service KPIs. TWAMP control client 32 establishes a second control connection 33 with a TWAMP session initiator 36 on second network device 8 in the network (402).

TWAMP control client 32 sends, to TWAMP server 38A over the first control connection, a first set of TWAMP control messages to negotiate data session 37A for a given service and one or more service KPIs to be measured for the given service (404). The selected service KPIs for the given service may include one or more of keepalive measurements, round trip time measurements, path delay measurements, service latency measurements, or service load measurements. In some examples, as part of the first set of control messages, TWAMP control client 32 sends a service monitoring request message requesting which services are supported at TWAMP server 38A; receives a service monitoring response message including a number of the supported services, a service ID for each of the supported services, and supported service KPIs for each service ID from TWAMP server 38A; and sends a service monitoring acknowledgement message including the selected service KPIs from among the list of supported KPIs for each service ID to TWAMP server 38A. In additional examples, as part of the first set of control messages, TWAMP control client 32 sends a request session message requesting data session 37A for the given service, including the service ID to identify the given service, to TWAMP server 38A; and receives an accept session message accepting data session 37A for the given service, including a SID to identify data session 37A, from TWAMP server 38B.

TWAMP control client 32 then sends, to TWAMP session initiator 36 over second control connection 33, a second set of TWAMP control messages instructing TWAMP session initiator 36 to establish data session 37A for the given service with TWAMP server 38A (406). In some examples, as part of the second set of control messages, TWAMP control client 32 sends a data session message instructing TWAMP session initiator 36 to establish data session 37A for the given service with TWAMP server 38A. The data session message may include the SID to identify data session 37A, sender port and address information for TWAMP session initiator 36, and receiver port and address information for TWAMP server 38A.

TWAMP control client 32 receives, from the TWAMP session initiator over second control connection 33, service data measurements for the selected service KPIs associated with data session 37A for the given service from TWAMP initiator 36 (408). In some examples, as an optional part of the second set of control messages, TWAMP control client 32 may send a request service data message requesting the service data measurements for the selected service KPIs associated with data session 37A for the given service from TWAMP session initiator 36. In other examples, TWAMP control client 32 may receive the service data measurements for the selected service KPIs from TWAMP session initiator 36 periodically. TWAMP control client 32 may then send the selected service KPIs measured for the given service to NFV-O 13, which may use the selected service KPIs to manage the network.

Figure 20:
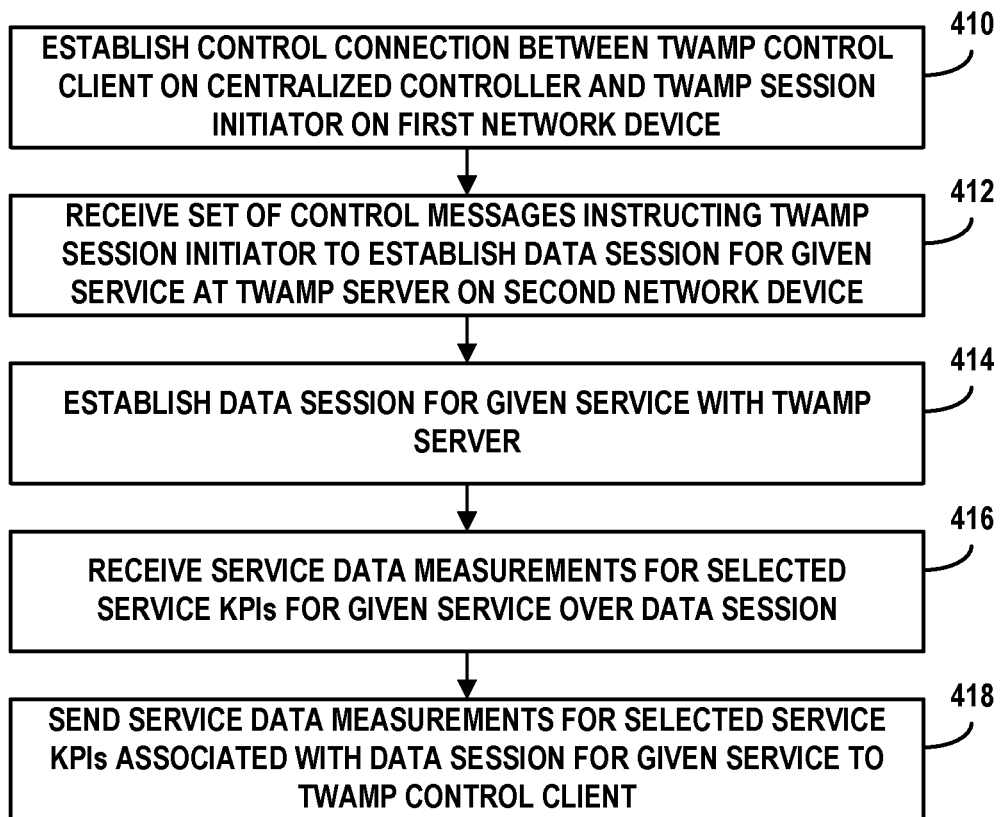
FIG. 20 is a flowchart illustrating an example operation of a TWAMP session initiator in a network device of a network, in accordance with the techniques of this disclosure.

FIG. 20 is a flowchart illustrating an example operation of a TWAMP session initiator in a network device of a network, in accordance with the techniques of this disclosure. The example operation of FIG. 20 will be described with respect to TWAMP session initiator 36 on first network device 8 from FIG. 2. In other examples, the operation illustrated in FIG. 20 may be performed by TWAMP session initiators 60 from FIG. 3 or TWAMP session initiator 72 from FIG. 4, or in other scenarios in which a TWAMP session initiator is executed on a network device separate from a TWAMP control client.

TWAMP session initiator 36 on first network device 8 establishes control connection 33 with TWAMP control client 32 on SDN controller 14 of the network (410). TWAMP session initiator 36 then receives, from TWAMP control client 32 over control connection 33, a set of TWAMP control messages instructing TWAMP session initiator 36 to establish data session 37A for a given service supported at TWAMP server 38A on second network device 30A in the network (412). In some examples, as part of the set of control messages, TWAMP session initiator 36 receives a data session message instructing TWAMP session initiator 36 to establish data session 37A for the given service with TWAMP server 38A, including a SID identifying data session 37A, sender port and address information for TWAMP session initiator 36, and receiver port and address information for TWAMP server 38A.

TWAMP session initiator 36 establishes data session 37A for the given service with TWAMP server 38A (414). TWAMP session initiator 36 then receives service data measurements for one or more selected service KPIs to be measured for the given service over data session 37A from TWAMP server 38A (416). The selected service KPIs for the given service may be negotiated between TWAMP control client 32 and TWAMP server 38A. The selected service KPIs for the given service may include one or more of keepalive measurements, round trip time measurements, path delay measurements, service latency measurements, or service load measurements. In some example, TWAMP session initiator 36 receives a TWAMP test packet from TWAMP server 38A including a list of the selected service KPIs included in the TWAMP test packet, and the service data measurements for the selected service KPIs associated with data session 37A for the given service. The service data measurements may be included in one of a packet padding area, a service PDU, a SDU, or a header of the TWAMP test packet.

TWAMP session initiator 36 sends, to TWAMP control client 32 over control connection 33, the service data measurements for the selected service KPIs associated with data session 37A for the given service (418). In some examples, as an optional part of the set of control messages, TWAMP session initiator 36 receives a request service data message from TWAMP control client 32 requesting the service data measurements for the selected service KPIs associated with the data session for the given service from the TWAMP session initiator. In other examples, TWAMP session initiator 36 may send the service data measurements for the selected service KPIs to TWAMP control client 32 periodically.

Figure 21:
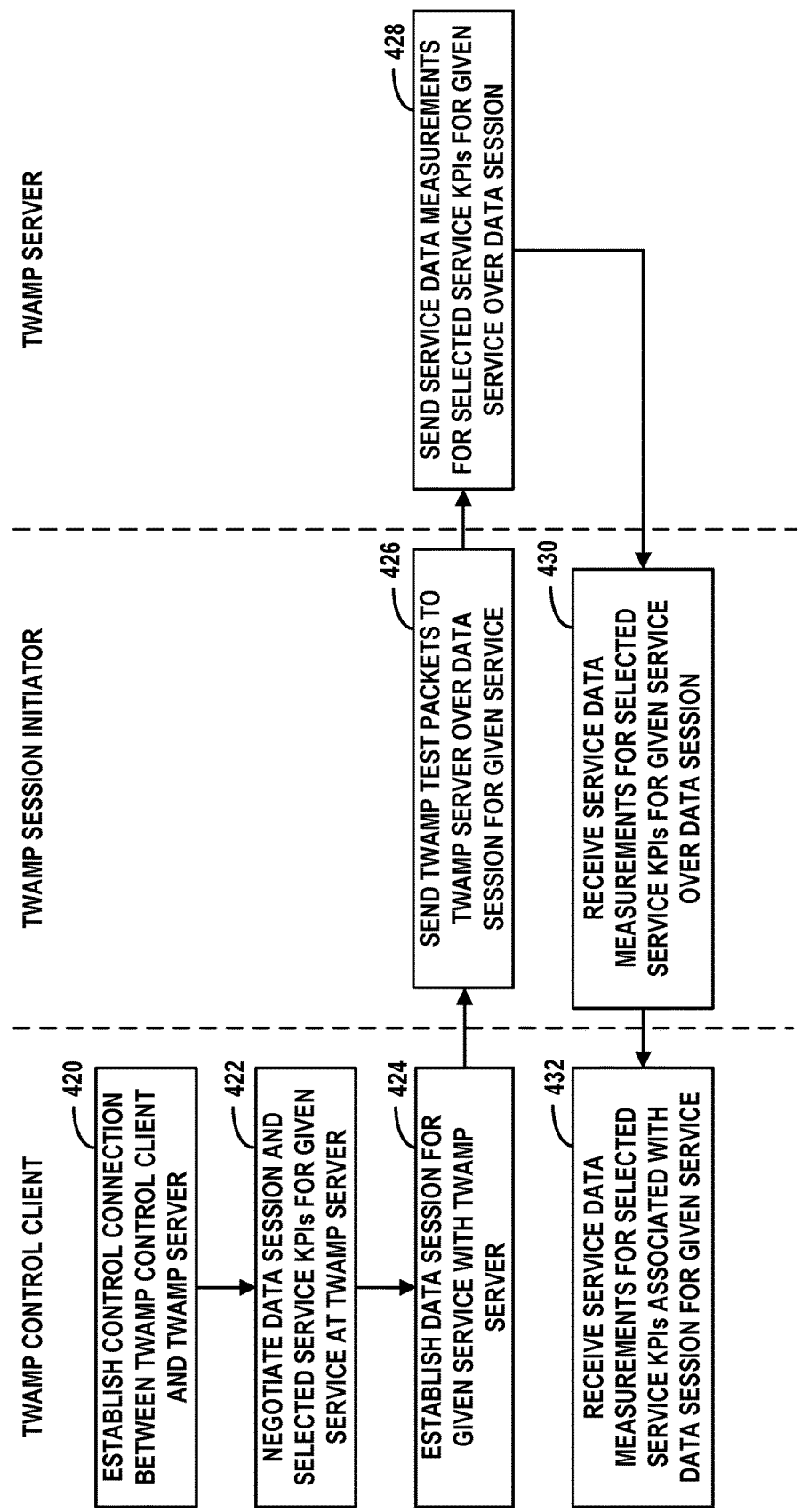
FIG. 21 is a flowchart illustrating an example operation of a system including a TWAMP control client, a TWAMP session initiator, and a TWAMP server, in accordance with the techniques of this disclosure.

FIG. 21 is a flowchart illustrating an example operation of a system including a TWAMP control client, a TWAMP session initiator, and a TWAMP server, in accordance with the techniques of this disclosure. The example operation of FIG. 21 will be described with respect to TWAMP control client 32, TWAMP session initiator 36, and TWAMP server 38A from FIG. 2. In other examples, the operation illustrated in FIG. 21 may be performed by the TWAMP units included in any of the example use cases illustrated in FIGS. 3 and 4, or in other scenarios in which a TWAMP session initiator is executed on a network device separate from a TWAMP control client. In still other examples, the operation illustrated in FIG. 21 may be performed by TWAMP units in scenarios in which a TWAMP session initiator is executed on a same network device as a TWAMP control client.

TWAMP control client 32 establishes a control connection with TWAMP server 38A (420). TWAMP control client 32 negotiates data session 37A for a given service and selects one or more service KPIs to be measured for the given service at TWAMP server 38A (422). The selected service KPIs for the given service may include one or more of keepalive measurements, round trip time measurements, path delay measurements, service latency measurements, or service load measurements. TWAMP control client 32 then establishes data session 37A for the given service with TWAMP server 38A (424).

Upon establishment of data session 37A, a session sender associated with either TWAMP control client 32 or TWAMP session initiator 36 (as illustrated in FIG. 21) may send TWAMP test packets to a session reflector associated with TWAMP server 38A over data session 37A for the given service (426). In response to the TWAMP test packets from TWAMP session initiator 36, the session reflector associated with TWAMP server 38A sends service data measurements for the selected service KPIs for the given service over data session 37A to the session sender associated with either TWAMP session initiator 36 or TWAMP control client 32 (428). TWAMP session initiator 36 receives the service data measurements for the selected service KPIs for the given service from TWAMP server 38A over data session 37A (430). Additionally, TWAMP control client 32 also receives the service data measurements for the selected service KPIs associated with data session 37A for the given service (432).

In some cases, TWAMP control client 32 and TWAMP session initiator 36 may be executed on the same network device. In this case, TWAMP control client 32 may establish data session 37A for the given service with TWAMP server 38A, and either TWAMP control client 32 or TWAMP session initiator 36 may send the TWAMP test packets to TWAMP server 38A over data session 37A for the given service and receive the service data measurements for the selected service KPIs for the given service from TWAMP server 38A over data session 37A. Since TWAMP control client 32 and TWAMP session initiator 36 are on the same network device, both TWAMP session initiator 36 and TWAMP control client 32 may receive the service data measurements for the selected service KPIs for the given service from TWAMP server 38A over data session 37A.

In other cases, e.g., as illustrated in FIG. 2, TWAMP control client 32 may be executed on a centralized controller device of the network that is separate from the network device on which TWAMP session initiator 36 is executed. In this case, TWAMP control client 32 may establish data session 37A for the given service by sending a set of TWAMP control messages over control connection 33 instructing TWAMP session initiator 36 to establish data session 37A for the given service with TWAMP server 38A. As a further example, in this case, TWAMP session initiator 36 may receive the set of TWAMP control messages from TWAMP control client 32 instructing TWAMP session initiator 36 to establish data session 37A for the given service; establish data session 37A for the given service with TWAMP server 38A; send the TWAMP test packets to TWAMP server 38A over data session 37A for the given service; receive the service data measurements for the selected service KPIs for the given service from TWAMP server 38A over data session 37A; and send the service data measurements for the selected service KPIs associated with data session 37A for the given service to TWAMP control client 32. Since TWAMP control client 32 and TWAMP session initiator 36 are on separate network devices, TWAMP control client 32 receives the service data measurements for the selected service KPIs associated with data session 37A for the given service from TWAMP session initiator 36 over control connection 33.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include RAM, ROM, PROM, EPROM, EEPROM, flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
sending, by a two-way active measurement protocol (TWAMP) control client on a centralized controller device of a network and to a TWAMP server in the network over a first control connection, a first set of TWAMP control messages to negotiate a data session for a given service supported at the TWAMP server;
sending, by the TWAMP control client and to a TWAMP session initiator in the network over a second control connection, a second set of TWAMP control messages instructing the TWAMP session initiator to establish the data session for the given service with the TWAMP server;
receiving, by the TWAMP control client and from the TWAMP session initiator over the second control connection, service data measurements for the given service, wherein the service data measurements are collected by the TWAMP session initiator from the TWAMP server over the data session; and sending, by the TWAMP control client and to a network functions virtualization (NFV) orchestrator device in communication with the centralized controller device, the service data measurements for the given service, wherein the service data measurements for the given service are used by the NFV orchestrator device to manage network resources with respect to the given service.

2. The method of claim 1, wherein sending the first set of TWAMP control messages to negotiate the data session for the given service comprises selecting one or more service key performance indicators (KPIs) to be measured for the given service, and wherein the selected service KPIs for the given service include one or more of keepalive measurements, round trip time measurements, path delay measurements, service latency measurements, or service load measurements.

3. The method of claim 1, further comprising establishing the first control connection between the TWAMP control client on the centralized controller device and the TWAMP server, wherein establishing the first control connection comprises receiving, by the TWAMP control client from the TWAMP server, a TWAMP greeting message that identifies a mode supported at the TWAMP server, the mode indicating whether the TWAMP server supports monitoring of service key performance indicators (KPIs).

4. The method of claim 1, wherein sending the first set of TWAMP control messages to negotiate the data session for the given service comprises:
sending, by the TWAMP control client to the TWAMP server, a service monitoring request message requesting which services are supported at the TWAMP server;
receiving, by the TWAMP control client from the TWAMP server, a service monitoring response message including a number of the supported services, a service identifier (ID) for each of the supported services, and supported service key performance indicators (KPIs) for each service ID; and
sending, by the TWAMP control client to the TWAMP server, a service monitoring acknowledgement message selecting one or more service KPIs to be measured for the given service from among the supported service KPIs for each service ID.

5. The method of claim 1, wherein sending the first set of TWAMP control messages to negotiate the data session for the given service comprises:
sending, by the TWAMP control client to the TWAMP server, a request session message requesting the data session for the given service, the request session message including a service identifier (ID) to identify the given service; and
receiving, by the TWAMP control client from the TWAMP server, an accept session message accepting the data session for the given service, the accept session message including a session identifier (SID) to identify the data session.

6. The method of claim 5, wherein sending the second set of TWAMP control messages instructing the TWAMP session initiator to establish the data session for the given service comprises:
sending, by the TWAMP control client to the TWAMP session initiator, a data session message instructing the TWAMP session initiator to establish the data session for the given service with the TWAMP server, the data session message including the SID to identify the data session, sender port and address information for the TWAMP session initiator, and receiver port and address information for the TWAMP server.

7. The method of claim 1, wherein sending the second set of TWAMP control messages instructing the TWAMP session initiator to establish the data session for the given service comprises:
sending, by the TWAMP control client to the TWAMP session initiator, a request service data message requesting the service data measurements for the given service from the TWAMP session initiator.

8. The method of claim 1,
wherein the TWAMP server is running on one of a physical chassis of a first network device or a virtual machine of the first network device;
wherein the TWAMP session initiator is running on one of a physical chassis of a second network device or a virtual machine of the second network device; and
wherein the centralized controller device is a different device than each of the first network device or the second network device.

9. The method of claim 1, wherein the TWAMP server and the TWAMP session initiator are each running on one of a physical chassis of a network device or on a dedicated virtual machine of the network device, and wherein the centralized controller device is a different device than the network device.

10. The method of claim 1, wherein the given service comprises a virtualized network service managed by the NFV orchestrator device.

11. A centralized controller device of a network, the centralized controller device comprising:
a memory; and
one or more processors in communication with the memory and configured to execute a two-way active measurement protocol (TWAMP) control client, the TWAMP control client configured to:
send, to a TWAMP server in the network over a first control connection, a first set of TWAMP control messages to negotiate a data session for a given service supported at the TWAMP server;
send, to a TWAMP session initiator in the network over a second control connection, a second set of TWAMP control messages instructing the TWAMP session initiator to establish the data session for the given service with the TWAMP server;
receive, from the TWAMP session initiator over the second control connection, service data measurements for the given service, wherein the service data measurements are collected by the TWAMP session initiator from the TWAMP server over the data session; and
send, to a network functions virtualization (NFV) orchestrator device in communication with the centralized controller device, the service data measurements for the given service, wherein the service data measurements for the given service are used by the NFV orchestrator device to manage network resources with respect to the given service.

12. The centralized controller device of claim 9, wherein, to negotiate the data session for the given service, the TWAMP control client is configured to select one of more service key performance indicators (KPIs) to be measured for the given service, and wherein the selected service (KPIs) for the given service include one or more of keepalive measurements, round trip time measurements, path delay meassurments, service latency measurments, or service load measurements.

13. The centralized controller device of claim 11, wherein the TWAMP control client is configured to establish the first control connection between the TWAMP control client on the centralized controller device and the TWAMP server, and wherein, to establish the first control connection, the TWAMP control client is configured to receive, from the TWAMP server, a TWAMP greeting message that identifies a mode supported at the TWAMP server, the mode indicating whether the TWAMP server supports monitoring of service key performance indicators (KPIs).

14. The centralized controller device of claim 9, wherein, to negotiate the data session for the given service, the TWAMP control client is configured to:
  send, to the TWAMP server, a service monitoring request message requesting which services are supported at the TWAMP server;
  receive, from the TWAMP server, a service monitoring response message including a number of supported services, a service identifier (ID) for each of the supported services, and supported servce key perfomance indicators (KPIs) for each service ID; and
  sned, to the TWAMP server, a service monitoring acknowledgment message selecting one or more service KPIs to be measrured for the given service from among the supported service KPIs for each service ID.

15. The centralized controller device of claim 9, wherein, to negotiate the data session for the given service, the TWAMP control client is configured to:
  send, to the TWAMP server, a request session message requesting the data session for the given service, the request session message including a service identifier (ID) to identify the given service; and
  receive, from the TWAMP server, an accept session message accepting the data session for the given service, the accept session message including a session identifier (SID) to identify the data session.

16. The centralized controller device of claim 13, wherein, to establish the data session for the given service, the TWAMP control client is configured to send, to the TWAMP session initiator, a data session message instructing the TWAMP session initiator to establish the data session for the given service with the TWAMP server, the data session message including the SID to identify the data session, sender port and address information for the TWAMP session initiator, and receiver port and address information for the TWAMP server.

17. The centralized controller device of claim 9, wherein, to establish the data session for the given service, the TWAMP control client is configured to send, to the TWAMP session initiator, a request service data message requesting the service data measurements for the given service from the TWAMP session initiator.

18. The centralized controller device of claim 11,
  wherein the TWAMP server is running on one of a physical chassis of a first network device or a virtual machine of the first network device;
  wherein the TWAMP session initiator is running on one of a physical chassis of a second network device or a virtual machine of the second network device; and
  wherein the centralized controller device is a different device than each of the first network device or the second network device.

19. The centralized controller device of claim 11, wherein the TWAMP server and the TWAMP session initiator are each running on one of a physical chassis of a network device or on a dedicated virtual machine of the network device, and wherein the centralized controller device is a different device than the network device.

20. The centralized controller device of claim 11, wherein the given service comprises a virtualized network service managed by the NFV orchestrator device.

* * * * *

UNITED STATES PATENT AND TRADEMARK OFFICE
CERTIFICATE OF CORRECTION

PATENT NO. : 10,742,770 B2  
APPLICATION NO. : 16/030226  
DATED : August 11, 2020  
INVENTOR(S) : Peyush Gupta, Amit Kumar Agarwal and Srivathsa Sarangapani Page 1 of 1

It is certified that error appears in the above-identified patent and that said Letters Patent is hereby corrected as shown below:

In the Claims

Column 42, Line 62 (Claim 12) Replace "The centralized controller device of claim 9," with --The centralized controller device of claim 11,--

Column 43, Line 14 (Claim 14) Replace "The centralized controller device of claim 9," with --The centralized controller device of claim 11,--

Column 43, Line 29 (Claim 15) Replace "The centralized controller device of claim 9," with --The centralized controller device of claim 11,--

Column 44, Line 3 (Claim 16) Replace "The centralized controller device of claim 13," with --The centralized controller device of claim 15,--

Column 44, Line 13 (Claim 17) Replace "The centralized controller device of claim 9," with --The centralized controller device of claim 11,--

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*